US011642813B2

(12) United States Patent
Beall et al.

(10) Patent No.: US 11,642,813 B2
(45) Date of Patent: May 9, 2023

(54) CERAMIC HONEYCOMB BODIES, HONEYCOMB EXTRUSION DIES, AND METHODS OF MAKING CERAMIC HONEYCOMB BODIES

(71) Applicant: CORNING INCORPORATED, Corning, NY (US)

(72) Inventors: Douglas Munroe Beall, Painted Post, NY (US); Dana Craig Bookbinder, Corning, NY (US); Thomas William Brew, Corning, NY (US); Kenneth Richard Miller, Addison, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/405,726

(22) Filed: Aug. 18, 2021

(65) Prior Publication Data

US 2021/0370216 A1 Dec. 2, 2021

Related U.S. Application Data

(62) Division of application No. 15/755,910, filed as application No. PCT/US2016/048345 on Aug. 24, 2016, now Pat. No. 11,117,083.

(Continued)

(51) Int. Cl.
*B28B 3/26* (2006.01)
*B01D 46/00* (2022.01)
*B01D 46/24* (2006.01)

(52) U.S. Cl.
CPC .......... *B28B 3/269* (2013.01); *B01D 46/0001* (2013.01); *B01D 46/001* (2013.01);

(Continued)

(58) Field of Classification Search
CPC .............. B01D 46/0001; B01D 46/001; B01D 46/2429; B01D 46/2418; B01D 46/2444;
(Continued)

(56) References Cited

U.S. PATENT DOCUMENTS 3,837,783 A 9/1974 Bagley
3,885,977 A * 5/1975 Lachman ............ C04B 38/0006
428/116

(Continued)

FOREIGN PATENT DOCUMENTS

CN 104647569 A 5/2015
JP 57-077521 A 5/1982
(Continued)

OTHER PUBLICATIONS

International Search Report and Written Opinion of the International Searching Authority; PCT/US2016/048345 dated Nov. 28, 2016; 13 Pages; European Patent Office.

*Primary Examiner* — Jonathan Miller
*Assistant Examiner* — Gabriel E Gitman
(74) *Attorney, Agent, or Firm* — Joseph M. Homa

(57) ABSTRACT

A method and extrusion die to form a laminar integral skin of a honeycomb structure is provided. The method includes extruding a ceramic precursor batch through a die with feedholes in entry side and slots in exit face of the die to form the honeycomb structure. In a region on the periphery of the die configured to form the cell matrix, a series of concentric slots around the matrix in the exit face of the die are configured to feed skin onto the matrix. Ring sections between concentric slots are angled away from the center and a mask is disposed on top of the periphery producing a channel for extruded skin to meet and bond to extruded matrix. Optionally, slots in the skin-forming ring sections enhance knitting between laminar skin layers.

15 Claims, 20 Drawing Sheets

Related U.S. Application Data

(60) Provisional application No. 62/211,981, filed on Aug. 31, 2015.

(52) U.S. Cl.
CPC ....... *B01D 46/247* (2013.01); *B01D 46/2418* (2013.01); *B01D 46/2429* (2013.01); *B01D 46/2444* (2013.01); *B01D 46/2462* (2013.01); *B01D 46/2474* (2013.01); *B01D 46/2476* (2021.08); *B01D 46/2482* (2021.08); *B01D 46/2492* (2021.08); *B01D 46/24493* (2021.08); *B01D 46/24494* (2021.08)

(58) Field of Classification Search
CPC ........ B01D 46/24493; B01D 46/24494; B01D 46/2476; B28B 3/269; B28B 3/206; B29L 2031/60; C04B 38/0006
See application file for complete search history.

(56) References Cited

U.S. PATENT DOCUMENTS

| | | | |
|---|---|---|---|
| 4,384,841 A | 5/1983 | Yamamoto et al. | |
| 5,219,509 A | 6/1993 | Cocchetto et al. | |
| 5,256,054 A | 10/1993 | Cocchetto et al. | |
| 5,265,054 A | 11/1993 | McClure | |
| 5,865,983 A | 2/1999 | Seely | |
| 5,964,020 A * | 10/1999 | Kragle | B28B 3/269 425/464 |
| 6,248,421 B1 | 6/2001 | Koike et al. | |
| 6,455,124 B1 | 9/2002 | Beall et al. | |
| 7,575,793 B2 * | 8/2009 | Aniolek | B01D 46/247 428/116 |
| 7,914,724 B2 | 3/2011 | Bookbinder et al. | |
| 2002/0098320 A1 | 7/2002 | Beall et al. | |
| 2004/0148916 A1 * | 8/2004 | Merkel | B01D 46/2429 264/44 |
| 2004/0266619 A1 | 12/2004 | Bernas et al. | |
| 2007/0026188 A1 * | 2/2007 | Bookbinder | B28B 3/269 428/73 |
| 2009/0028982 A1 | 1/2009 | Asaoka | |
| 2009/0041635 A1 | 2/2009 | Berkey et al. | |
| 2009/0137382 A1 | 5/2009 | Merkel | |
| 2010/0156010 A1 | 6/2010 | Merkel | |
| 2012/0301664 A1 | 11/2012 | Chapman et al. | |
| 2014/0294691 A1 | 10/2014 | Kikuchi et al. | |
| 2015/0137431 A1 | 5/2015 | Hayashi | |

FOREIGN PATENT DOCUMENTS

| | | |
|---|---|---|
| JP | 11-268018 A | 10/1999 |
| JP | 2006-027129 A | 2/2006 |
| JP | 2011-504869 A | 2/2011 |

* cited by examiner

CERAMIC HONEYCOMB BODIES, HONEYCOMB EXTRUSION DIES, AND METHODS OF MAKING CERAMIC HONEYCOMB BODIES

CROSS-REFERENCE TO RELATED APPLICATIONS

This application is a Divisional of U.S. patent application Ser. No. 15/755,910, filed on Feb. 27, 2018, which is a national stage application under 35 U.S.C. § 371 of International Application No. PCT/US2016/048345, filed on Aug. 24, 2016, which in turn claims the benefit of priority to U.S. Provisional Application No. 62/211,981, filed on Aug. 31, 2015, the contents of each are incorporated herein by reference in their entireties.

BACKGROUND

Field

Exemplary embodiments of the present disclosure relate to ceramic honeycomb bodies.

Discussion of the Background

Ceramic wall flow filters can be used for the removal of particulate pollutants from fluid streams such as diesel, gasoline, or other combustion engine exhaust streams. There are a number of different approaches for manufacturing such filters from channeled honeycomb structures formed of porous ceramics. For example, one approach is to position cured plugs of sealing material at the ends of alternate channels of such structures, which can block direct fluid flow through the channels and force the fluid stream through the porous channel walls of the honeycombs before exiting the filter.

The above information disclosed in this Background section is only for enhancement of understanding of the background of the claimed invention and therefore it may contain information that does not form any part of the prior art nor what the prior art may suggest to a person of ordinary skill in the art.

SUMMARY

Exemplary embodiments of the present disclosure provide a honeycomb body comprising laminar skin.

Exemplary embodiments of the present disclosure also provide a method of making a honeycomb body comprising laminar skin.

Exemplary embodiments of the present disclosure also provide an extrusion die configured to extrude a batch of ceramic precursor material into a green honeycomb body comprising laminar skin.

Additional features of the invention as claimed will be set forth in the description which follows, and in part will be apparent from the description, or may be learned by practice of the claimed invention.

Exemplary embodiments disclose a green honeycomb body, including a matrix of intersecting walls that form channels extending axially from a first end face to a second end face and a laminar skin disposed on the matrix at the periphery extending from the first end face to the second end face. A majority of the cross sectional area of the laminar skin comprises axially aligned particles substantially the same as the intersecting walls.

Exemplary embodiments also disclose a porous ceramic honeycomb body, including a matrix of intersecting walls that form channels extending axially from a first end face to a second end face and a laminar skin disposed on the matrix at the periphery extending from the first end face to the second end face. A majority of the cross sectional area of the laminar skin crystal structure includes an axially aligned texture substantially the same as the intersecting walls.

Exemplary embodiments also disclose a method of making a porous ceramic honeycomb body comprising intersecting walls that form channels extending axially from a first end face to a second end face. The method includes extruding batch material through central slots of an extrusion die to form a honeycomb matrix and through a plurality of annular slots to form peripheral skin on the honeycomb matrix, the central slots terminate at a first annular slot of the plurality of annular slots. Elongated particles in the batch material are axially aligned during the extruding through the central and annular slots.

Exemplary embodiments also disclose a honeycomb extrusion die including a die body comprising a die face comprising a plurality of central slots and a skin former region disposed peripheral to the central slots, the skin former region comprising a plurality of annular slots wherein the central slots terminate at a first annular slot of the plurality of annular slots.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this specification, illustrate exemplary embodiments of the disclosure, and together with the description serve to explain the principles of the disclosure.

In FIG. 16, three areas selected for S-value analysis are shown. A die such as shown in FIG. 9 having some radially extending slots 463 in the skin former region was used to make the honeycomb body green ware of FIG. 16.

DETAILED DESCRIPTION

Figure 1A:
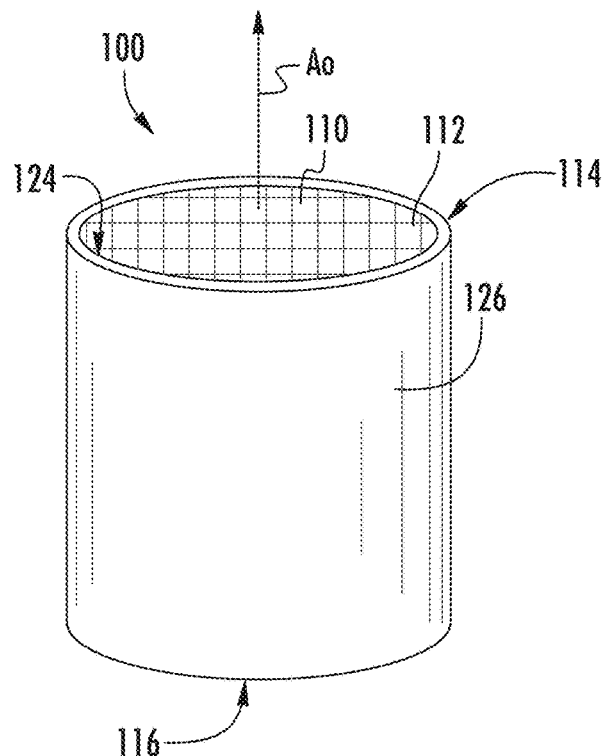
FIG. 1A shows a schematic perspective view of a honeycomb body comprising a skin on an outer periphery of a honeycomb core according to exemplary embodiments of the disclosure.

The disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these embodiments are provided so that this disclosure is thorough, and will fully convey the scope of the disclosure to those skilled in the art. In the drawings, the size and relative sizes of layers and regions may be exaggerated for clarity.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, XY, YZ, ZZ, etc.).

While terms such as, top, bottom, side, upper, lower, vertical, and horizontal are used, the disclosure is not so limited to these exemplary embodiments. Instead, spatially relative terms, such as "top", "bottom", "horizontal", "vertical", "side", "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, dimensions, and like values, and ranges thereof, employed in describing the embodiments of the disclosure, refers to variation in the numerical quantity that can occur, for example: through typical measuring and handling procedures used for preparing materials, compositions, composites, concentrates, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

In these exemplary embodiments, the disclosed articles, and the disclosed method of making one or more of the articles provide one or more advantageous features or aspects, including for example as discussed below. Features or aspects recited in any of the claims are generally applicable to all facets of the disclosure. Any recited single or multiple feature or aspect in any one claim can be combined or permuted with any other recited feature or aspect in any other claim or claims.

The after-treatment of exhaust gas from internal combustion engines may use catalysts supported on high-surface area substrates and/or a catalyzed filters for the removal of carbon soot particles. Catalyst supports may be refractory, thermal shock resistant, stable under a range of $pO_2$ conditions, non-reactive with the catalyst system, and offer low resistance to exhaust gas flow. Generally, porous ceramic flow-through honeycomb substrates and wall-flow honeycomb filters (generically referred to herein as honeycomb bodies) may be used in these applications.

Ceramic cement may be used to form an exterior skin of a honeycomb body which has been machined or "contoured" to a desired dimension, or an exterior skin may be co-extruded with the honeycomb body. Co-extrusion generally refers to batch flow through a die at the time of forming a honeycomb monolith or body segment. For example, when batch flows through a die to form a matrix and a skin the skin can be referred to as a co-extruded skin. As used herein, co-extrusion generally refers to batch flow through matrix regions and skin regions of the die simultaneously. Generally a co-extruded skin can be considered to be integral with the matrix. As used herein, the term "honeycomb body" includes single honeycomb monoliths and honeycomb body segments. Bodies formed by multiple honeycomb body segments that are secured together, such as by using a ceramic cement to form a segmented monolith can be referred to as a segmented honeycomb body.

The manufacture of porous ceramic honeycomb bodies may be accomplished by the process of plasticizing ceramic powder batch mixtures, extruding the mixtures through honeycomb extrusion dies to form honeycomb extrudate, and cutting, drying, and firing the extrudate to produce ceramic honeycomb bodies and segmented honeycomb bodies of high strength and thermal durability having channels extending axially from a first end face to a second end face.

A co-extruded or an after-applied exterior skin may form an outer peripheral surface extending axially from a first end face to a second end face of the ceramic honeycomb bodies. In some embodiments, channels of the honeycomb bodies defined by intersecting walls (webs), whether monolithic or segmented, can be plugged at an inlet face or an outlet face to produce a filter. When some channels are left unplugged at both ends a partial filter can be produced. The honeycomb body, whether monolithic or segmented, can be catalyzed to produce a substrate. A non-plugged honeycomb body is generally referred to herein as a substrate. A catalyzed substrate can have an after applied catalyst or comprise an extruded catalyst. Further, filters and partial filters can be catalyzed to provide multi-functionality. The ceramic honeycomb bodies thus produced may be widely used as catalyst supports, as membrane supports, as wall-flow filters, as partial filters, and as combinations thereof for cleaning fluids such as purifying engine exhausts or other fluid streams such as air or gas streams or liquid or water streams.

Ceramic honeycomb body compositions are not particularly limited and can comprise major and minor amounts of cordierite, aluminum-titanate, mullite, β-spodumene, silicon carbide, zeolite and the like, and combinations thereof. As a further example, the ceramic honeycomb body can comprise an extruded catalyst, such as an extruded zeolite or other extruded catalyst material or combinations of materials. Likewise, the honeycomb body batch compositions can comprise one or more inorganic components that form cordierite, aluminum-titanate, mullite, β-spodumene, silicon carbide, zeolite and the like, and combinations thereof upon firing.

In some embodiments, cell density may be between about 100 and 900 cells per square inch (cpsi). Cell wall thicknesses can range from about 0.025 mm to about 1.5 mm (about 1 to 20 mil). For example, cell wall thicknesses can range from about 0.025 mm to about 0.30 mm (about 1 to 12 mil). For example, honeycomb body 100 geometries may be 400 cpsi with a wall thickness of about 8 mil (400/8) or with a wall thickness of about 6 mil (400/6). Other geometries include, for example, 100/17, 200/12, 200/19, 270/19, 600/4, 400/4, 400/3, 600/3, 750/2, 600/2, and 900/2, as well as other geometries. As used herein, honeycomb body 100 is intended to include a generally honeycomb structure but is not strictly limited to a square structure. For example, hexagonal, octagonal, triangular, rectangular or any other suitable cell shape or combination of cell shapes may be used. Also, a cross section of the cellular honeycomb body 100 may be circular, but it is not so limited, for example, the cross section may be elliptical, square, rectangular, other shape, or a combination thereof.

Some of the exemplary embodiments of this disclosure relate to a honeycomb body having a laminar integral skin on a central cell structure (matrix) having substantially the same physical thermal expansion properties as the matrix, that is, for example, substantially the same bulk coefficient of thermal expansion (CTE). For example, the skin CTE can be within 6 to $8 \times 10^{-7}$ K$^{-1}$ of the matrix CTE, the skin CTE can be within 3 to $5 \times 10^{-7}$ K$^{-1}$ of the matrix CTE, or the skin CTE can be within 1 to $2 \times 10^{-7}$ K$^{-1}$ of the matrix CTE. Some of the exemplary embodiments of this disclosure relate to a method to form a honeycomb body having a laminar co-extruded skin on a matrix having substantially the same physical thermal expansion properties as the matrix. Some of the exemplary embodiments of this disclosure relate to an extrusion die configured to form a honeycomb body having a laminar integral skin on a matrix having substantially the same physical thermal expansion properties as the matrix.

Figure 1B:
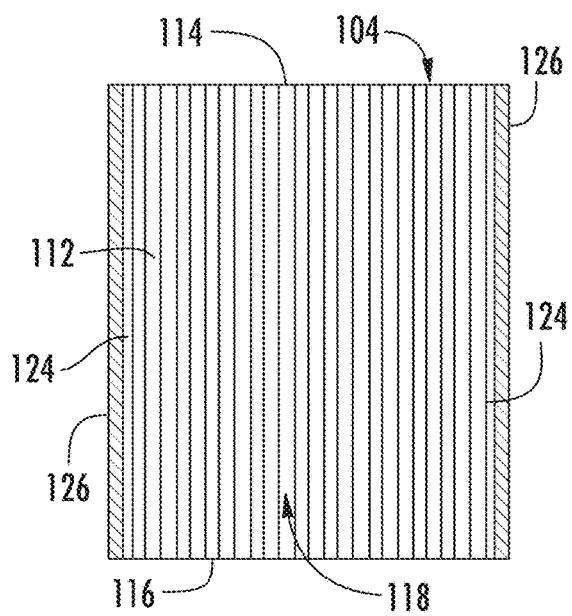
FIG. 1B is a schematic cross section through the honeycomb body of FIG. 1A according to these exemplary embodiments of the disclosure.
Figure 1C:
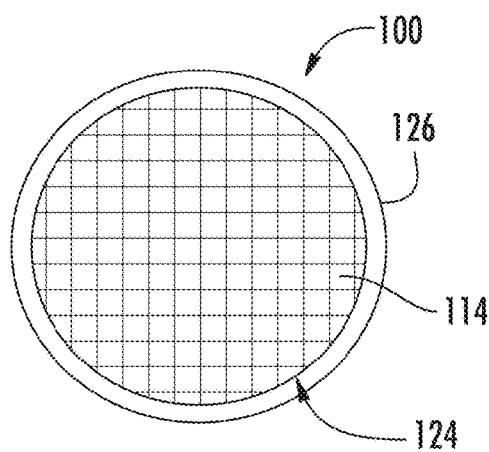
FIG. 1C is a schematic top view of the honeycomb body of FIG. 1A according to these exemplary embodiments of the disclosure.

FIG. 1A shows a honeycomb body 100 including a plurality of intersecting walls 110 that form mutually adjoining channels 112 extending axially in direction "Ao" between opposing end faces 114, 116, according to exemplary embodiments of the disclosure. FIG. 1B shows a schematic cross section through the honeycomb body 100 of FIG. 1A. FIG. 1C shows a schematic top view of the honeycomb body 100 of FIG. 1A. "Cell" is generally used herein when referring to intersecting walls in cross section of the honeycomb body and "channel" is generally used when referring to a cell extending between the end faces 114, 116. Cell and channel may be used interchangeably.

The top face 114 refers to the first end face and the bottom face 116 refers to the second end face of the honeycomb body 100 positioned in FIG. 1A, otherwise the end faces are not limited by the orientation of the honeycomb body 100. The top face 114 may be an inlet face and the bottom face 116 may be an outlet face of the honeycomb body 100 or the top face 114 may be an outlet face and the bottom face 116 may be an inlet face of the honeycomb body 100.

The central cell structure 118, also referred to herein interchangeably as the "matrix" or "cell matrix" of the honeycomb body 100, includes the intersecting walls 110 defining the channels 112 therebetween. The periphery 124 of the matrix 118 joins the co-extruded skin 126 and has the co-extruded skin 126 disposed thereon. As will be described in more detail below, the co-extruded skin 126 can be considered integral with the matrix. That is, as batch is extruded through a die the co-extruded skin knits with the matrix. Upon drying and/or firing of the extrudate, the skin 126 and the matrix 118 can be integral. According to exemplary embodiments, the integral skin 126 comprises a laminar structure having substantially the same thermal expansion properties as the matrix 118. For example, the laminar skin CTE can be within about $3\text{-}5\times10^{-7}$ $K^{-1}$ of the matrix CTE.

In some of these exemplary embodiments, the integral skin 126 can have a thickness greater than the thickness of the walls 110. For example, the integral skin 126 can have a thickness of greater than or equal to 0.004 inch (0.102 mm), greater than or equal to 0.010 inch (0.25 mm), or greater than or equal to 0.020 inch (0.508 mm). In some of these exemplary embodiments, the integral skin 126 can have a coefficient of thermal expansion (CTE) greater than or equal to the CTE of the walls. In some of these exemplary embodiments, the integral skin 126 can have a coefficient of thermal expansion (CTE) of less than or equal to $15\times10^{-7}\times10^{-7}$ $K^{-1}$ and the walls 110 have a CTE of less than or equal to $15\times10^{-7}$ $K^{-1}$. For example, the integral skin 126 can have a coefficient of thermal expansion (CTE) of less than or equal to $10\times10^{-7}$ $K^{-1}$ and the walls 110 have a CTE of less than or equal to $10\times10^{-7}$ $K^{-1}$, or even the integral skin 126 can have a coefficient of thermal expansion (CTE) of less than or equal to $5\times10^{-7}$ $K^{-1}$ and the walls 110 have a CTE of less than or equal to $5\times10^{-7}$ $K^{-1}$.

In some of these exemplary embodiments, the honeycomb body 100 can have a an isostatic strength that is greater than 200 psi (1.38 MPa), for example, greater than 500 psi (3.45 MPa), greater than 1000 psi (6.9 MPa), or even greater than 2000 psi (13.8 MPa). The integral laminar skin 126 having a small web affected zone on the honeycomb body matrix 118 provides a greater isostatic strength of the honeycomb body 100 than a honeycomb body without the integral laminar skin.

Figure 2:
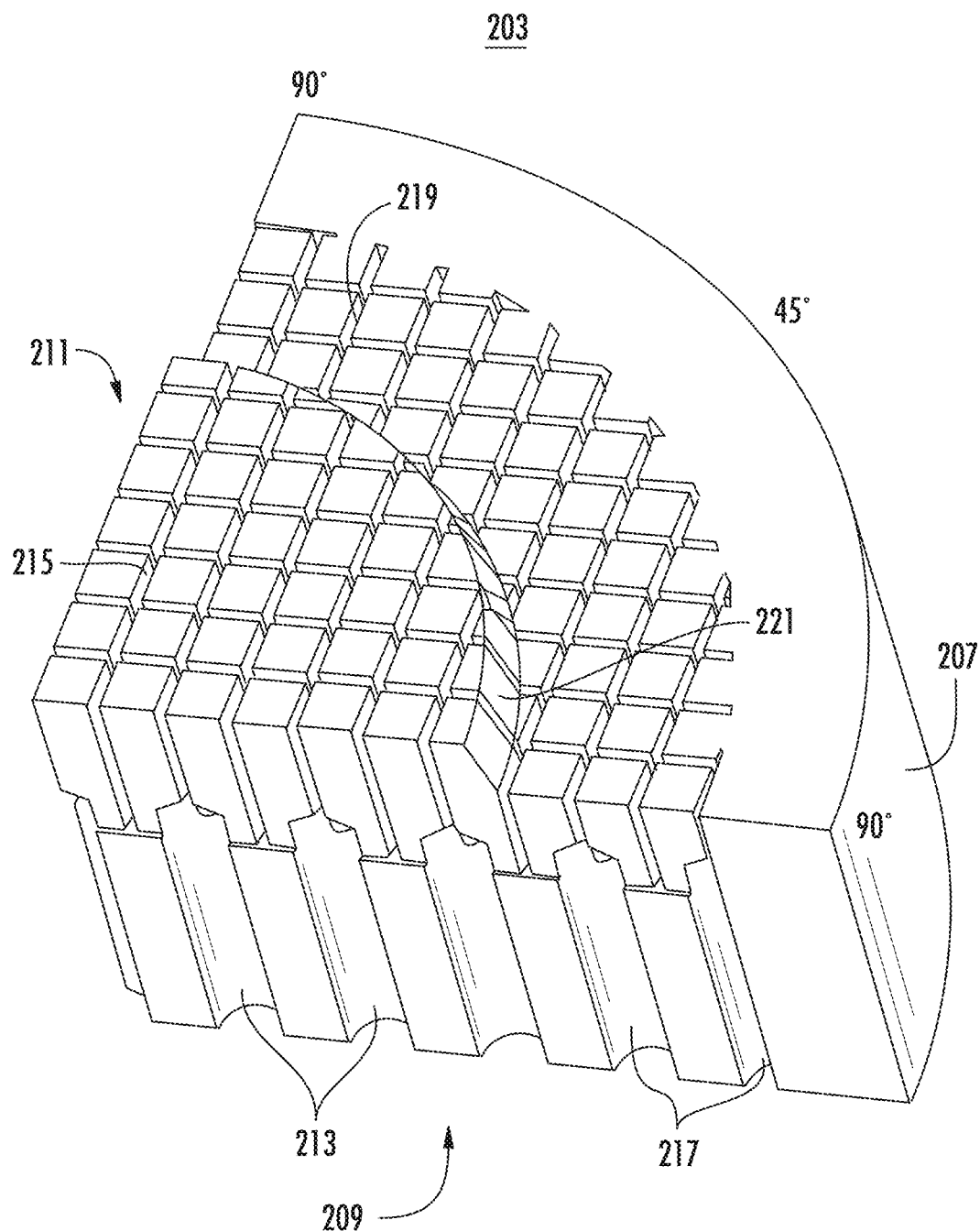
FIG. 2 is a cutaway isometric view of an extrusion die showing intersecting central slots that extend to peripheral slots beyond a skin forming surface.

Skin-forming methods have been devised for producing an integral skin on honeycomb substrates, for example, as disclosed in U.S. Pat. No. 7,914,724, the entire contents of which is hereby incorporated by reference as if fully set forth herein. However, skin-forming methods have generally relied on collapsing or crushing extruded cellular matrix material to form a layer of skin on top of the cellular matrix. This can be accomplished through use of a shim and mask positioned at the periphery of the matrix at the die exit. Additionally, the pins on the face of the die may be shaved down and angled away from the edge of the matrix to help achieve a skin that does not impinge on the periphery of the matrix which aids in avoiding collapsed cells at the periphery. FIG. 2 is a cutaway isometric view of an extrusion die 203 having a die body 207 with feed holes at an input surface 209 and extrusion slots at an exit surface 211. The central feed holes 213 are configured to feed batch material to intersecting central slots 215 and peripheral feed holes 217 are configured to feed batch to intersecting peripheral slots 219. The central slots 215 extend to the peripheral slots 219 beyond a skin former surface 221. The skin former surface 221 can form a cavity with a mask (not shown) spaced apart from the skin former surface 221 by the thickness of the co-extruded skin at the matrix of the honeycomb body.

In these types of skin-forming methods with dies such as shown in FIG. 2, where the central slots 215 extend beyond the skin former surface 221 to peripheral slots 219, the honeycomb body skin is formed by a different process than the honeycomb body matrix when co-extruded, resulting in physical properties of the skin different than physical properties of the matrix. For example, the coefficient of thermal expansion (CTE) has been found to vary across the skin and found to typically be higher than that measured in the matrix in the dried and fired ceramic honeycomb body.

Figure 3A:
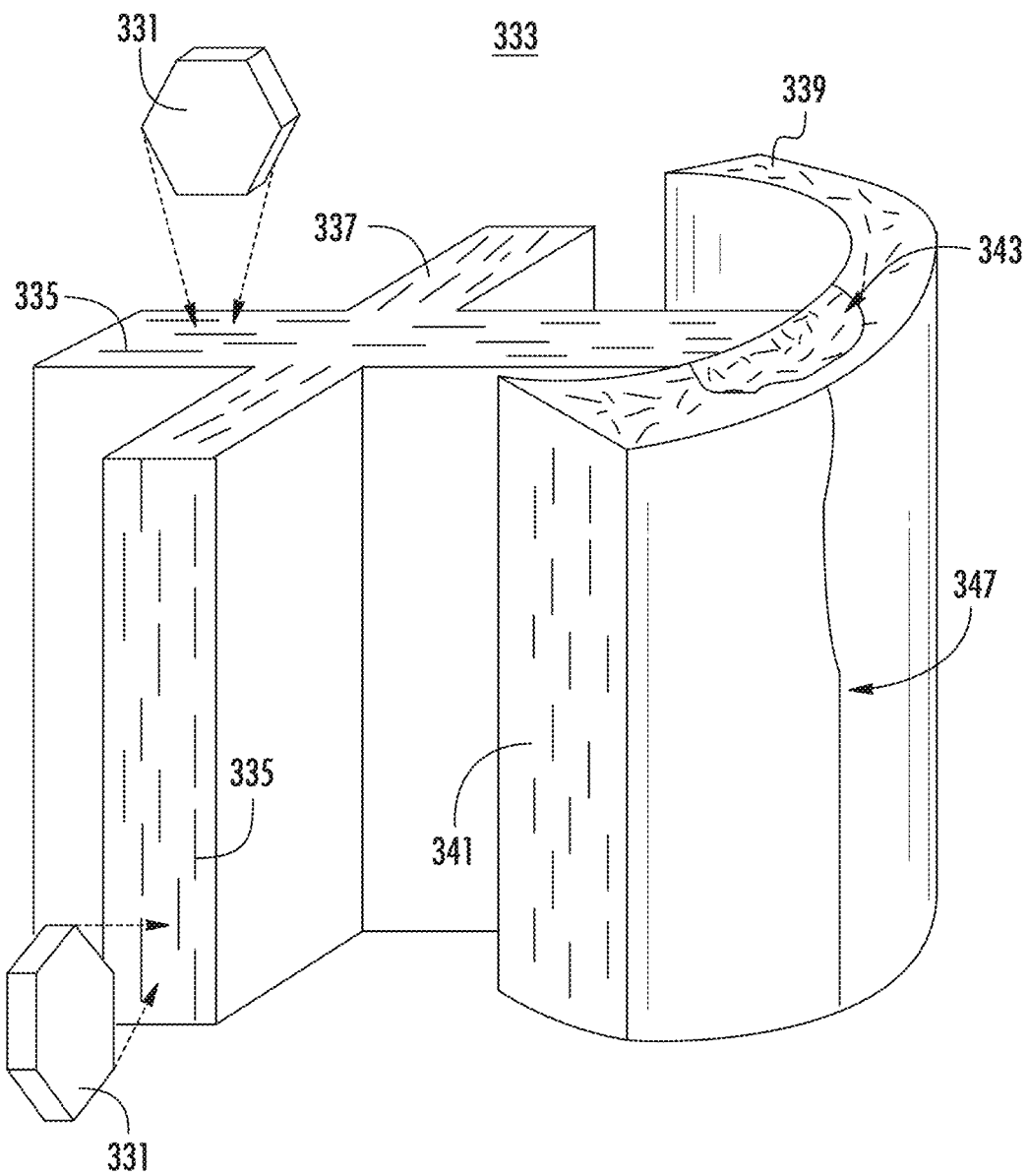
FIG. 3A is a schematic sectional isometric view of platy particle orientations of an extruded green honeycomb body with co-extruded skin such as extruded from the die of FIG. 2 and resulting oriented particle microstructure of fired ceramic honeycomb body.
Figure 3B:
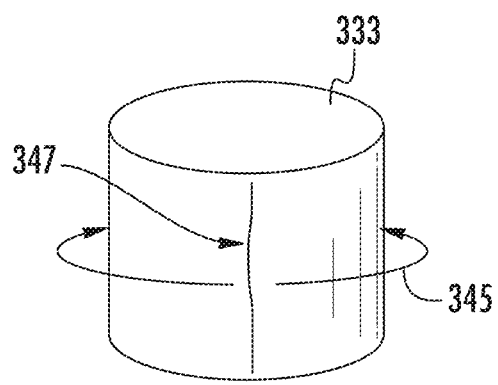
FIG. 3B is a schematic of tensile stresses in extruded skin created by higher coefficient of thermal expansion (CTE) in areas having particle alignment disruption more than adjacent areas.

While not wishing to be bound by theory, the variability in the CTE results from a disruption in the orientation of particles comprising the extruded webs. Referring to FIGS. 2, 3A, and 3B, platy talc and clay particles 331 are often used in the production of ceramic, for example, cordierite, honeycomb bodies 333. These platy particles 331 become oriented as they pass through the slots 215, 219 of the die 203 during the extrusion process and remain oriented in the extruded green part. Upon firing, the high degree of orientation produces a cordierite body with cordierite crystals that are preferentially oriented (aligned) with their low expansion c-axes 335 in the planes of the walls 337. This orientation is referred to herein as "axially aligned texture". This results in a lower thermal expansion coefficient than would be expected if the crystals were randomly oriented relative to the plane of the web. Since these types of skin-forming methods rely on the collapse of extruded webs through intersecting peripheral slots 219 to produce the skin 339, the action of the collapse of the webs produces a particle microstructure which is considerably less oriented or more randomly oriented (misaligned) 341 than the neighboring matrix walls 337.

The contrast between oriented particle microstructure in the matrix walls 337 and misaligned particle microstructure in the skin 339 can be most pronounced at points in the skin where there are no matrix walls 337 that are parallel with the skin 339. This occurs everywhere except at the 90°s. Additionally, at the 90° points on the periphery, the skin 339 has been produced by material extruded through slots 219 that are both parallel and perpendicular to the skin 339. Therefore, the sections of web that form the skin that were once oriented perpendicular to the skin must be collapsed down to become part of the skin 339. This results in misalignment of the particles even in the region of the skin 343 at the 90°s. The result of this skin forming is the generation of stresses 345 at the skin-matrix interface under heating and cooling during use due to thermal expansion mismatch at the interface. The region of the skin 339 of misaligned particle microstructure 343 is referred to herein as the "web affected zone" and can have a higher CTE than the matrix walls 337, as well as a higher CTE than adjoining skin 339 resulting in a tensile stress and cracking zone 347. This situation exists for most cell geometries including square, round, hexagonal, rectangular etc.

A radial cell ceramic honeycomb design is disclosed in U.S. Pat. No. 7,575,793, the entire contents of which is incorporated by reference as if fully set forth herein. A feature of the radial cell ceramic honeycomb design is that the cell structure is comprised of radial walls emanating from a central location and a series of concentric ring walls intersecting the radial walls. The skin-forming section of a die used to produce the radial cell ceramic honeycomb structure contains web walls which are always parallel to the skin. This can help minimize the mismatch between matrix and skin physical properties mentioned. However, use of conventional skin-forming hardware would still rely on the collapse of both the concentric rings and the perpendicular radial webs. The inventors have surprisingly found as disclosed herein, a way to produce a skin which is comprised mainly or entirely from material produced in the slots forming the concentric rings, having particles in the green ware and particulate microstructure in the fired ceramic ware substantially oriented in the same manner and in substantially the same direction as the interior webs by eliminating the radial slots in the skin-forming regions. This new discovery according to exemplary embodiments disclosed herein results in an integral skin having substantially the same physical thermal expansion properties as the matrix.

According to exemplary embodiments of the disclosure, a honeycomb body having a laminar integral skin on a central cell structure having substantially the same physical thermal expansion properties as the matrix, a method to form the honeycomb body having the laminar integral skin, and an extrusion die configured to form the honeycomb body having the laminar integral skin reduce the web affected zones, and overcome stresses and cracking from mismatch of skin and matrix physical thermal expansion properties.

Figure 4:
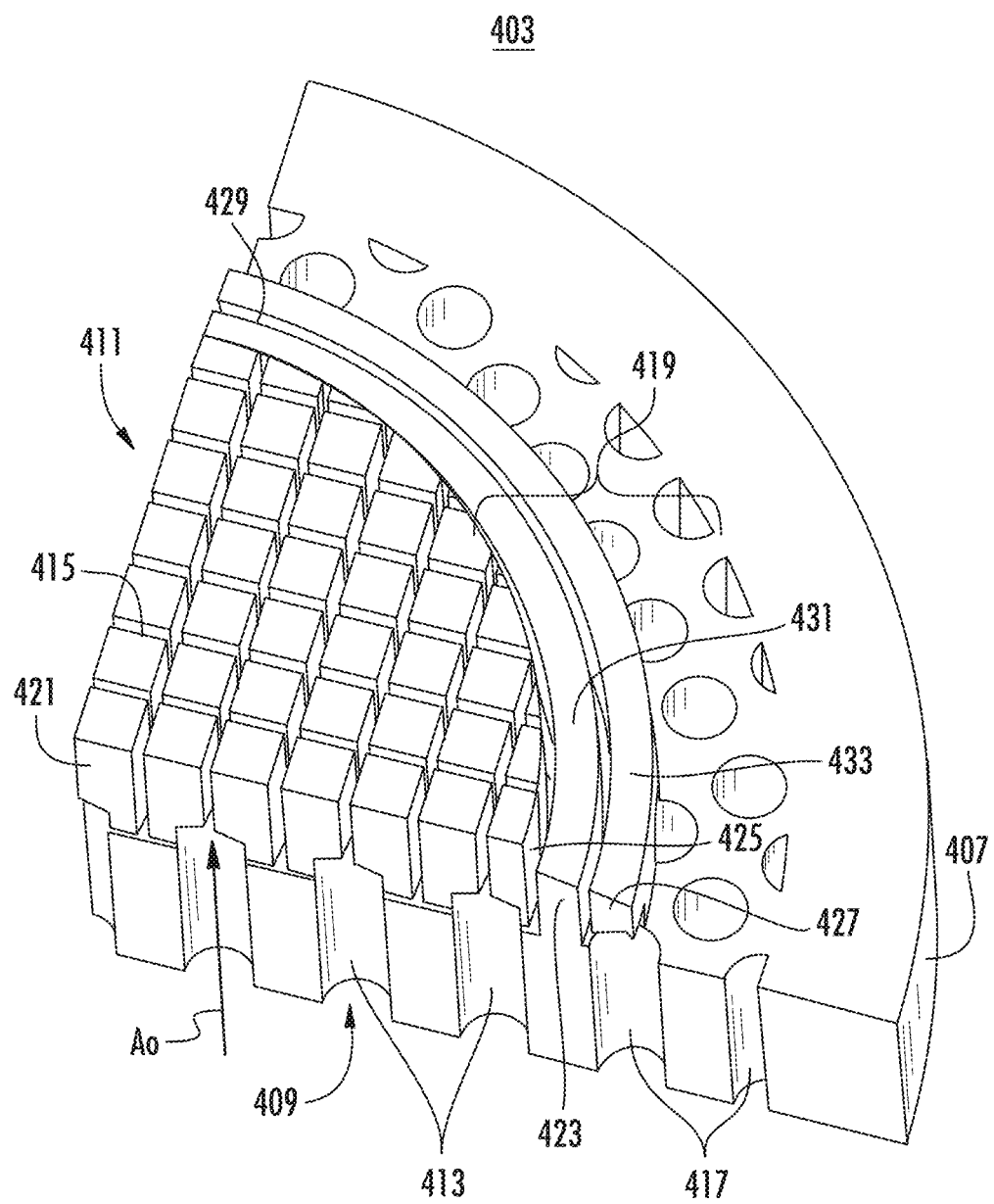
FIG. 4 is a cutaway isometric view of an extrusion die having a skin former region at the die periphery showing peripheral pins and slots according to some exemplary embodiments of the present disclosure.

FIG. 4 is a cutaway isometric view of an extrusion die having a skin former region at the die periphery showing peripheral pins and slots according to some exemplary embodiments of the present disclosure. The extrusion die 403 has a die body 407 with feed holes at an input surface 409 and extrusion slots at an exit surface (die face) 411. The central feed holes 413 are configured to feed batch material axially in direction "Ao" from a batch cavity to intersecting central slots 415 and peripheral feed holes 417 are configured to feed batch from the batch cavity to slots in a skin former region 419 at the periphery of the matrix. FIG. 5 is a detailed view of the die of FIG. 4 showing skin former peripheral pins and slots according to these exemplary embodiments of the present disclosure. The skin former region 419 can form a cavity with a mask.

Figure 5A:
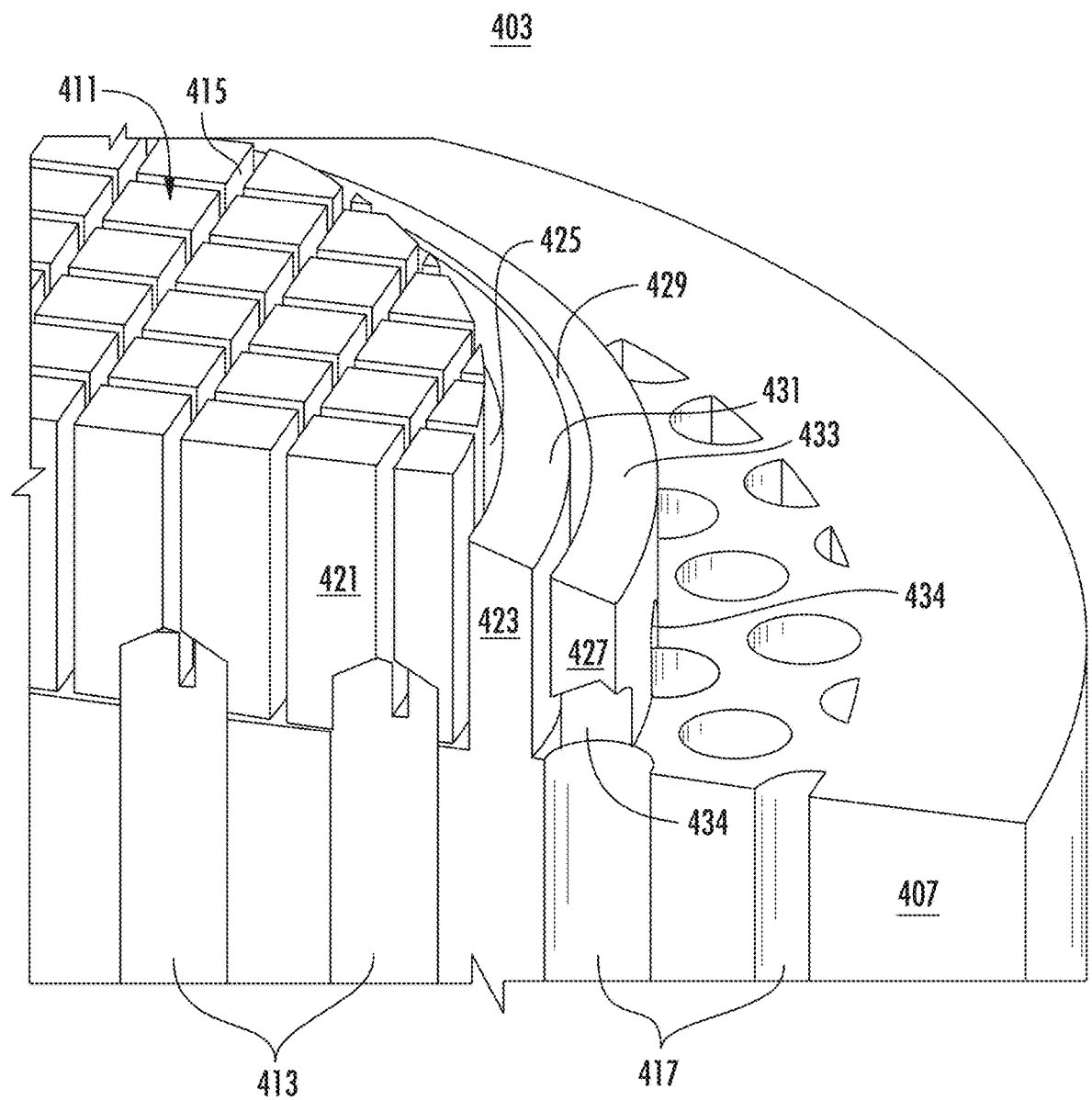
FIG. 5A is a detailed view of the die of FIG. 4 showing skin former peripheral pins and slots according to some exemplary embodiments of the present disclosure.
Figure 5B:
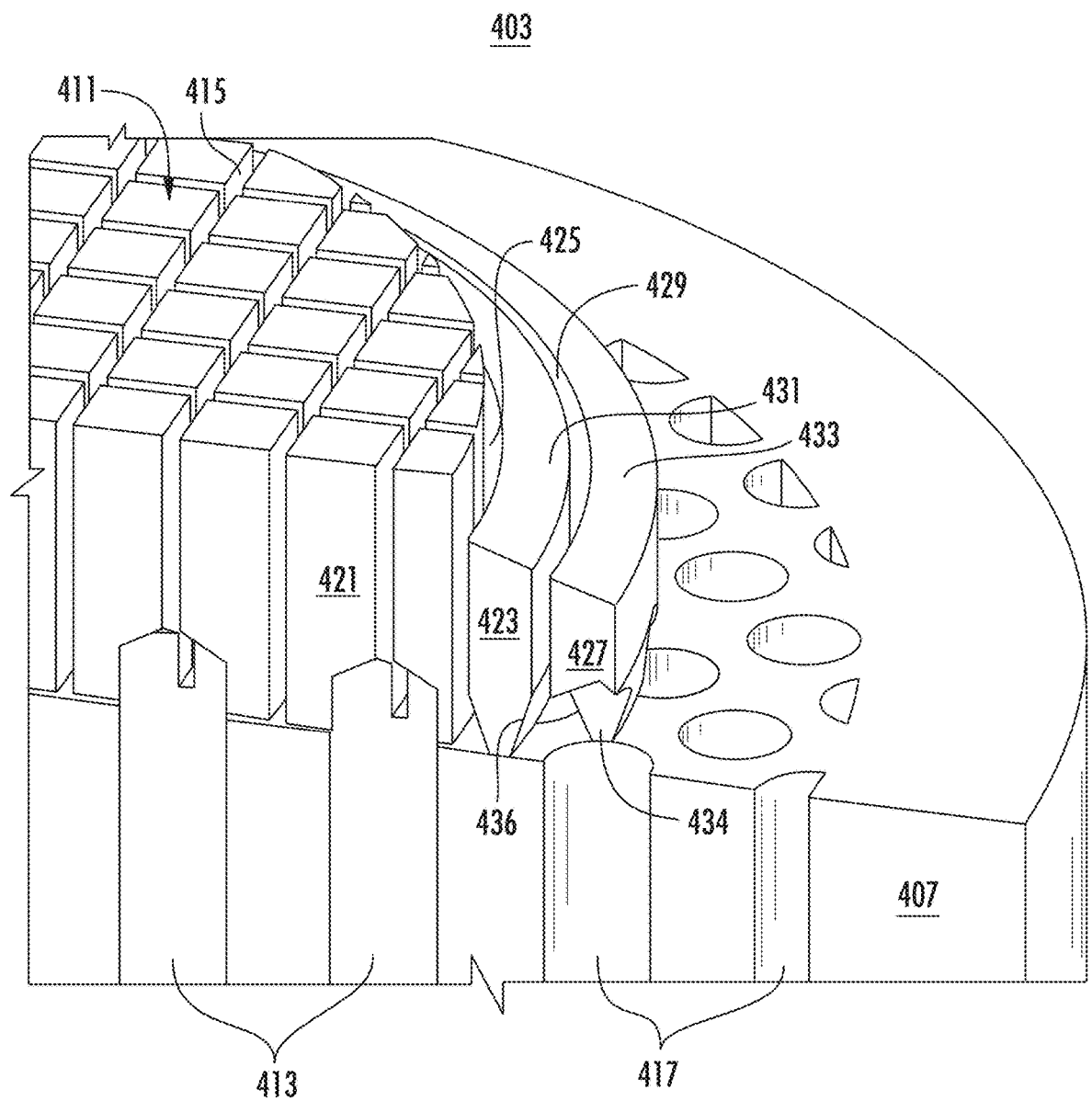
FIG. 5B illustrates that the base of skin former peripheral pins can be tapered according to some exemplary embodiments of the present disclosure.

Referring to FIGS. 4, 5A and 5B, the intersecting central slots 415 define central matrix pins 421 and do not extend beyond a first annular ring 423 in the skin forming region 419. The matrix pins 421 at the periphery of the matrix are spaced apart from the first annular ring 423 by a first annular slot 425. A second annular ring 427 can be spaced apart from the first annular ring 423 by a second annular slot 429. Optionally, one or more additional annular rings may be likewise arranged outwardly of the first and second annular rings 423, 427 forming one or more additional slots.

The peripheral feed holes 417 can extend into the annular rings 423, 427 to form a reservoir 434 to provide batch feed into the radial slots 425, 429 as illustrated in FIGS. 4, 5A and 5B. Alternatively or in addition, the radial slots 425, 429 can comprise a tapered base 436 to provide batch feed into the radial slots 425, 429 as illustrated in FIG. 5B according to some of these exemplary embodiments.

The first and second annular rings 423, 427 can have exit surfaces 431, 433, respectively, angled away from the center of the die body 407, and a mask (not shown) can be placed on top of the die 403 in the skin former region 419 to produce a channel for the extruded skin to meet and bond to the matrix extrudate. In these types of skin-forming methods with dies such as shown in FIGS. 4 and 5, where the central slots 415 do not extend peripherally beyond the first annular ring 423 in the skin former region 419, the honeycomb body skin is formed by a similar process to that of the honeycomb body matrix when co-extruded resulting in physical thermal expansion properties of the skin substantially the same as physical thermal expansion properties of the matrix.

According to some of these exemplary embodiments, the central slots 415 can comprise a thickness of greater than or equal to 0.001 inch (0.0254 mm) and less than or equal to 0.014 inch (0.356 mm) and the annular slots 425, 429 can comprise thicknesses of greater than or equal to 0.001 inch (0.0254 mm) and less than or equal to 0.014 inch (0.356 mm). According to some of these exemplary embodiments, the exit surfaces 431, 433 of the first and second annular rings 423, 427, respectively, can be angled away from the center of the die body 407 by an angle greater than or equal to 0 degrees from parallel to the die exit face and less than or equal to 60 degrees from parallel to the die exit face. According to some of these exemplary embodiments, the number of annular slots is not particularly limited and may include 2 to 7 slots. For example, the number of annular slots may include 2 annular slots, may include 3 annular slots, may include 4 annular slots, or may include 5 annular slots. Since the web affected zone is significantly confined to the first annular slot adjacent the matrix slots, increasing the annular slots confines the web affected zone to a narrower portion of the skin in the skin thickness direction.

Figure 6:
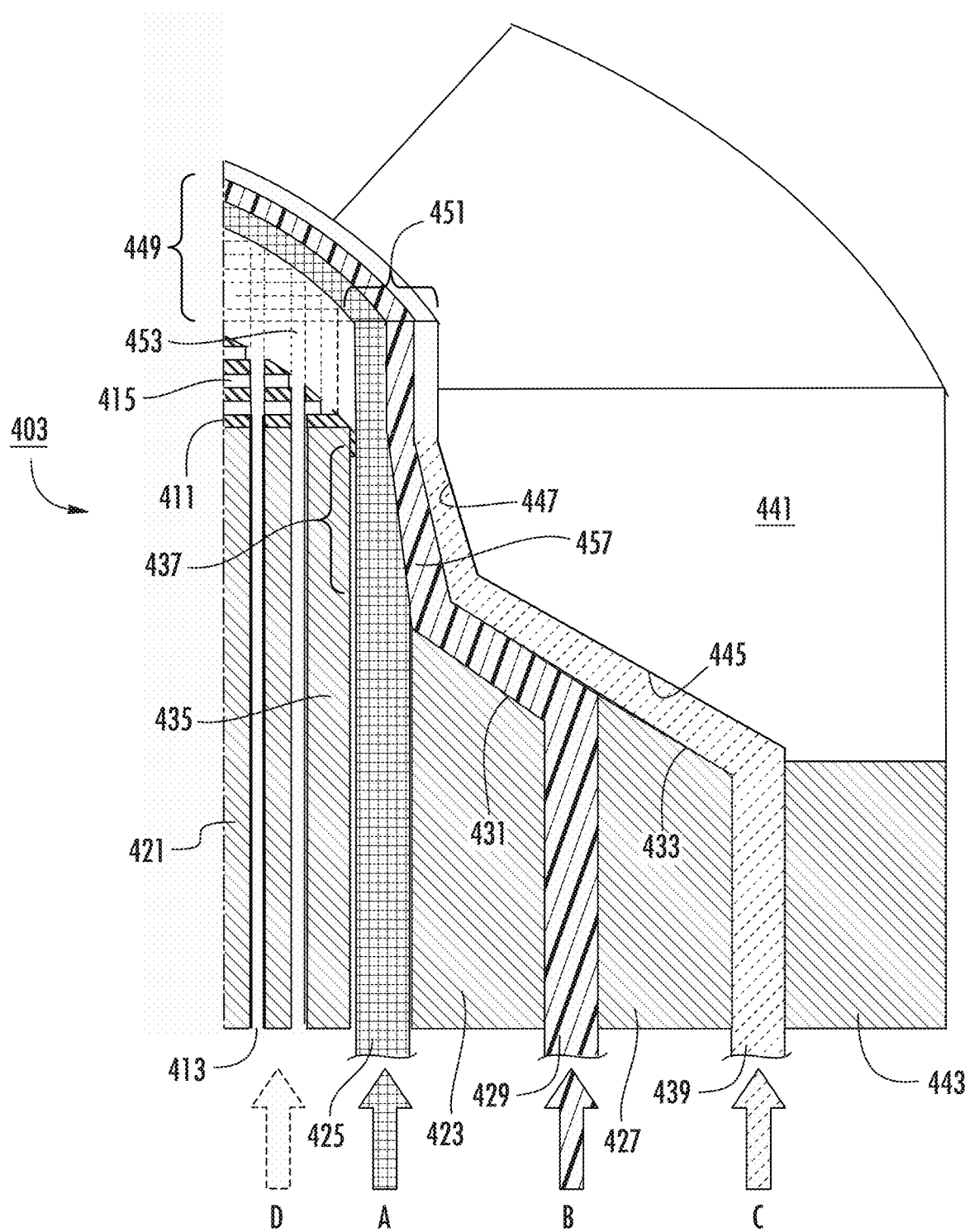
FIG. 6 is a schematic cross section isometric view of an extrusion die having a skin forming region at the die periphery showing peripheral pins and slots, a mask, and plasticized batch in slots, knit together in knitting region, and extruded as laminar skin according to some exemplary embodiments of the present disclosure.

FIG. 6 is a schematic cross section isometric view of an extrusion die having a skin forming region at the die periphery showing peripheral pins and slots, a mask, and plasticized batch in slots, knit together in knitting region, and extruded as laminar skin according to some exemplary embodiments of the present disclosure. In FIG. 6, the matrix pins 421 having slots 415 therebetween include outermost pins 435 spaced apart from the first annular ring 423 by the first annular slot 425. The annular rings 423, 427 can be considered pins, but are not pins in the traditional sense, but rather rings. Rings as used herein refers to the shape that circumscribes the matrix and is not intended to be limited to any particular shape, but can include circular, oval, asymmetrical, a combination of straight and curved segments and other shapes of honeycomb body cross sections. FIG. 6 shows a schematic of the batch flow pattern through the slots to feed the skin. The batch flow through the slots to feed the matrix depicted in dashed lines is also shown. The batch material is shown in different shadings (A, B, C, and D) to differentiate the batch flowing through different flow paths within the skin former region and the matrix.

The skin 451 depicted in FIG. 6 is referred to herein as laminar because, as described above, the platy particles in the batch that become oriented as they pass through the slots 413 and 425 of the die 403 during the extrusion process become misaligned in a web affected zone. However, the platy particles in the batch that become oriented as they pass through the outer annular slots 429 and 439 of the die 403 during the extrusion process hardly become misaligned and remain oriented in the extruded green part 449. The web affected zone hardly extends to the batch from the outer annular slots 429, 439 that forms outer layers of the skin 451. The plurality of annular slots 425, 429, 439 that orient the batch particles provide the laminar skin 451. Upon firing, the high degree of orientation produces a ceramic body with ceramic crystals that are preferentially oriented (aligned) in the outer skin with their low expansion axes in the plane of the skin as the web walls have the low expansion axes of the ceramic crystals oriented with their low expansion axes in the planes of the walls. Such a fired ceramic skin is also referred to herein as laminar.

According to the exemplary embodiments shown in FIG. 6, the skin forming rings 423, 427 are recessed below the exit surface of the matrix pins 421, 435 and have exit surfaces 431, 433 on an angle away from the surface and the center of the die 403. A mask 441 is depicted in the skin former region on a shim 443 to adjust batch material flow in the skin former region. The mask 441 and skin forming slots 425, 429, 439 are arranged to allow the batch to form a layered structure in the skin forming gap 457 as shown in the central portion of the figure. The edge of the mask 445, 447 which neighbors the outermost pins 435 is tapered toward the pins 435 to allow for compression and knitting of the layers of batch A, B, C to form the skin 451 in the skin forming gap 457. A portion of the mask edge 447 toward the exit surface can have a slight angle to provide knitting of the layered skin structure to the matrix 453 in a knitting region 437.

The extruded green honeycomb body walls 453 of the matrix are shown in dashed lines and meet the extruded laminar skin at the slots 415 between outermost matrix pins 435 and between the outermost matrix pins 435 and the first annular ring 423. Thus, any orientation disruption in the batch particles can be limited to a small region of the skin thickness. For example, the web affected zone can be limited to not more than about half the thickness of the skin thickness when two skin forming slots are used and not more than about a third the thickness of the skin thickness when three skin forming slots are used. For example, when four skin forming slots are used, the web affected zone can be limited to not more than about a quarter the thickness of the skin thickness, when five skin forming slots are used, the web affected zone can be limited to not more than about a fifth of the thickness of the skin thickness, and when six skin forming slots are used, the web affected zone can be limited to not more than about a sixth of the thickness of the skin thickness.

When two or more annular skin forming slots are used, the integral laminar skin can be thicker than the matrix webs to provide improved strength to the honeycomb body. The thick laminar skin can still have substantially the same physical thermal expansion properties as the thin webs, thus avoiding spider cracks and fissures that can otherwise develop during processing, such as firing, and during use, such as in automotive exhaust treatment.

Figure 7A:
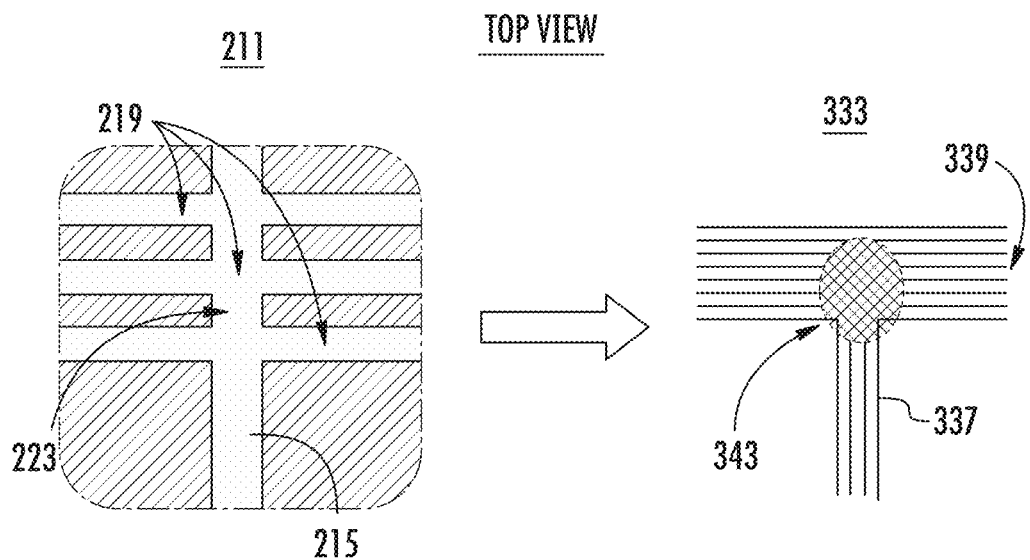
FIG. 7A is a schematic top view at die exit face of matrix slot that crosses skin former slots at the die periphery that can extrude non-laminar skin therefrom having misalignment zone and higher CTE than adjoining skin areas that may result in stress concentration in the misalignment zone or adjacent skin areas.
Figure 7B:
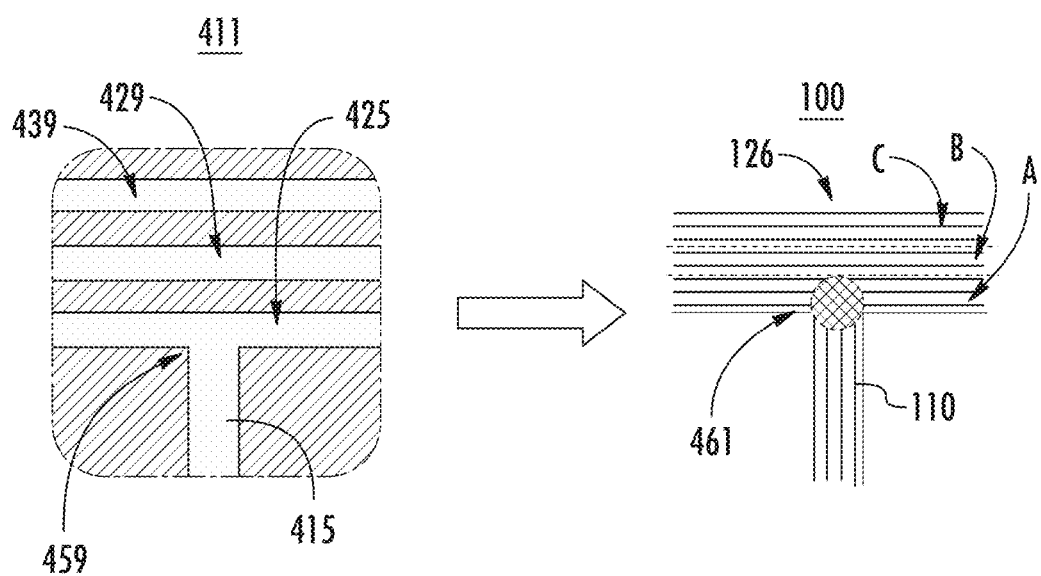
FIG. 7B is a schematic top view at die exit face of matrix slot that stops at a first skin former slot at the die periphery and extruded laminar skin therefrom having reduced misalignment zone confined to inner lamellae and according to some exemplary embodiments of the present disclosure.

FIG. 7A is a schematic top view at die exit face of matrix slot 215 that crosses skin former slots 219 at the die periphery 223 that can extrude non-laminar skin 339 therefrom having misalignment zone 343 and higher CTE than adjoining skin areas that may result in stress concentration in the misalignment zone 343 or adjacent skin areas. FIG. 7B is a schematic top view at die exit face 411 of matrix slot 415 that stops at a first skin former slot 425 at the die periphery 459 and extruded laminar skin 126 therefrom having reduced misalignment zone substantially confined to inner lamellae A apart from outer lamellae B and C according to some exemplary embodiments of the present disclosure.

Figure 8A:
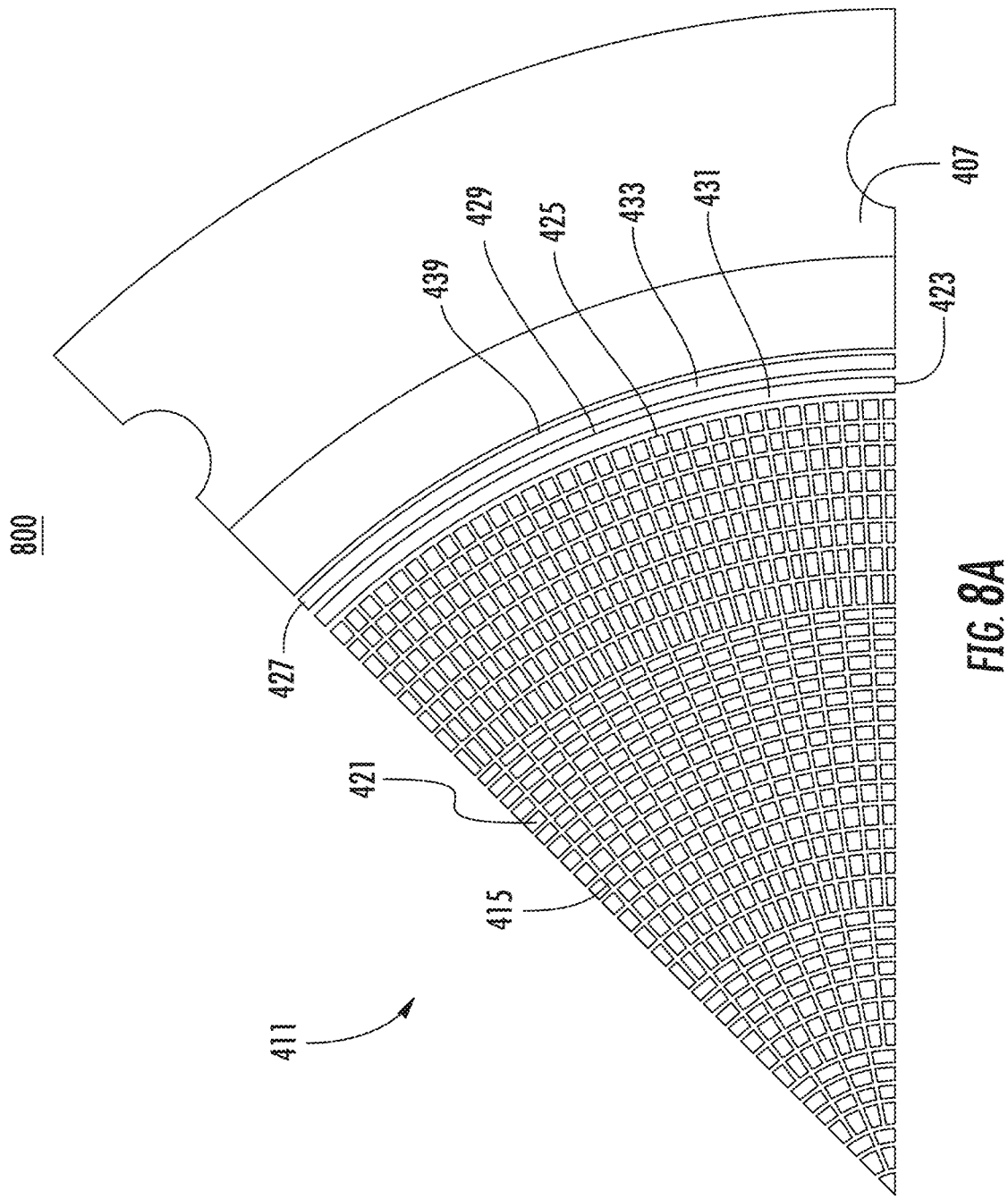
FIG. 8A is a top view of an extrusion die exit face having a radial cell geometry matrix and skin former region at the die periphery showing peripheral pins and slots according to some exemplary embodiments of the present disclosure.
Figure 8B:
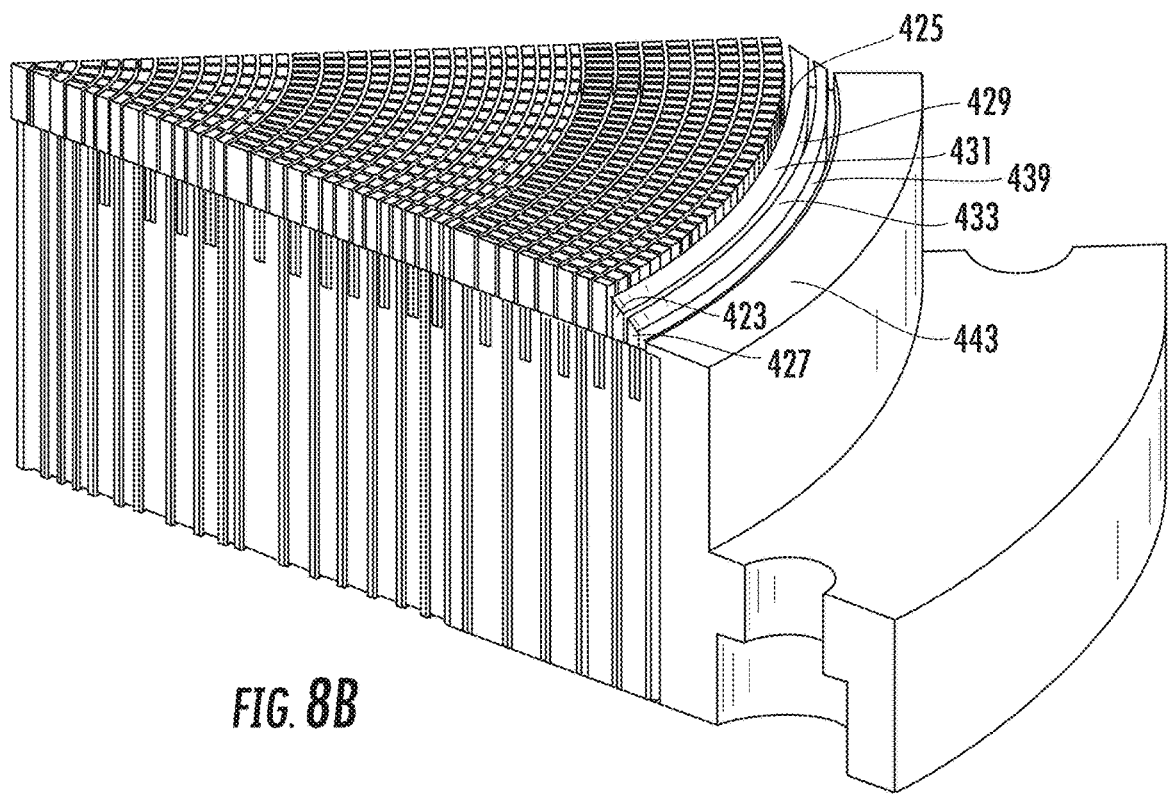
FIG. 8B is a cutaway isometric view of the extrusion die of FIG. 8A.
Figure 8C:
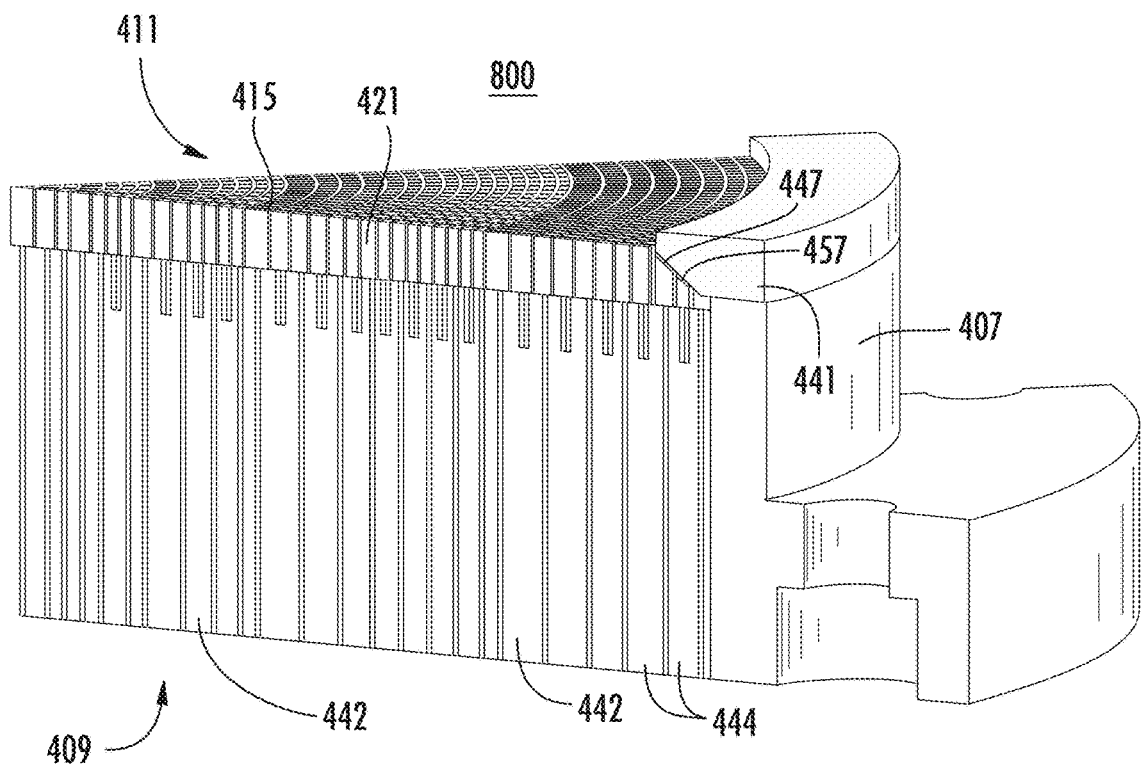
FIG. 8C is a cutaway isometric view of the extrusion die of FIG. 8A having a mask in the skin former region.

FIG. 8A is a top view of an extrusion die 800 exit face 411 having a radial cell geometry matrix of slots 415 and pins 421, and skin former region at the die periphery showing peripheral pins 423, 427 and slots 425, 429, 439 according to some exemplary embodiments of the present disclosure. FIG. 8B is a cutaway isometric view of the extrusion die 800 of FIG. 8A. FIG. 8C is a cutaway isometric view of the extrusion die 800 of FIG. 8A having a mask 441 in the skin former region. The peripheral pins 423, 427 of extrusion die 800 have no radial slots. The extrusion die 800 has a die body 407 with open cavity feed at the input surface 409. The central open cavities 442 are configured to feed batch material axially from the batch cavity to intersecting central slots 415 and peripheral open cavities 444 are configured to feed batch from the batch cavity to slots in the skin former region 419 at the periphery of the matrix.

Figure 9:
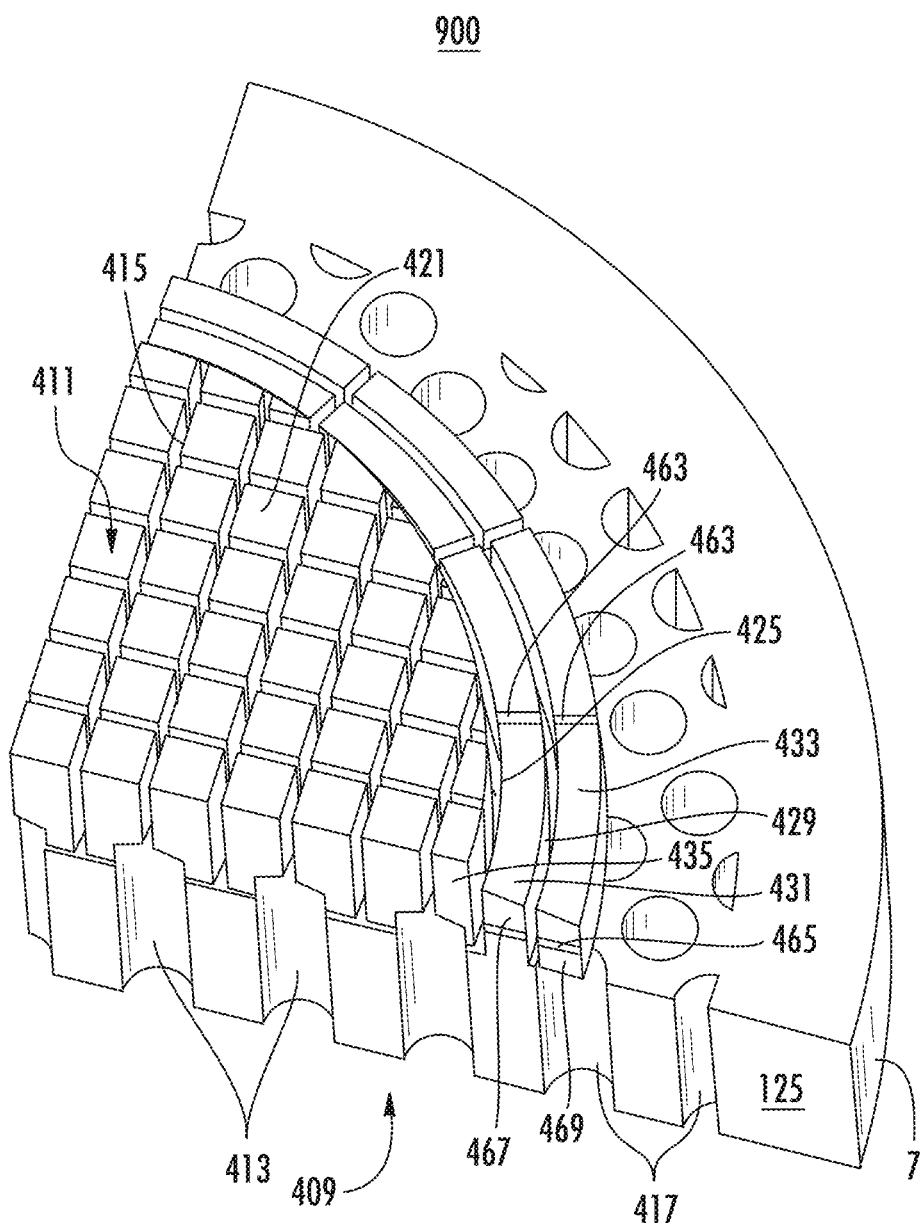
FIG. 9 is a cutaway isometric view of an extrusion die having a skin former region at the die periphery showing peripheral pins and slots according to some exemplary embodiments of the present disclosure.

FIG. 9 is a cutaway isometric view of an extrusion die 900 having a die body 125 with a skin former region at the die periphery showing peripheral pins 467, 469 and slots 425, 429 according to some exemplary embodiments of the present disclosure. The skin forming pins 467, 469 have radial slots 463 to enhance knitting between lamellae of skin. To maintain good orientation of particles in the laminar skin, the frequency of radial slots 463 is less than the frequency of the matrix slots at the first skin forming slot 425. The skin forming pins 467, 469 are also referred to herein as rings and the radial slots 463 can have various depths 465 to enhance knitting between lamellae of skin.

Figure 10:
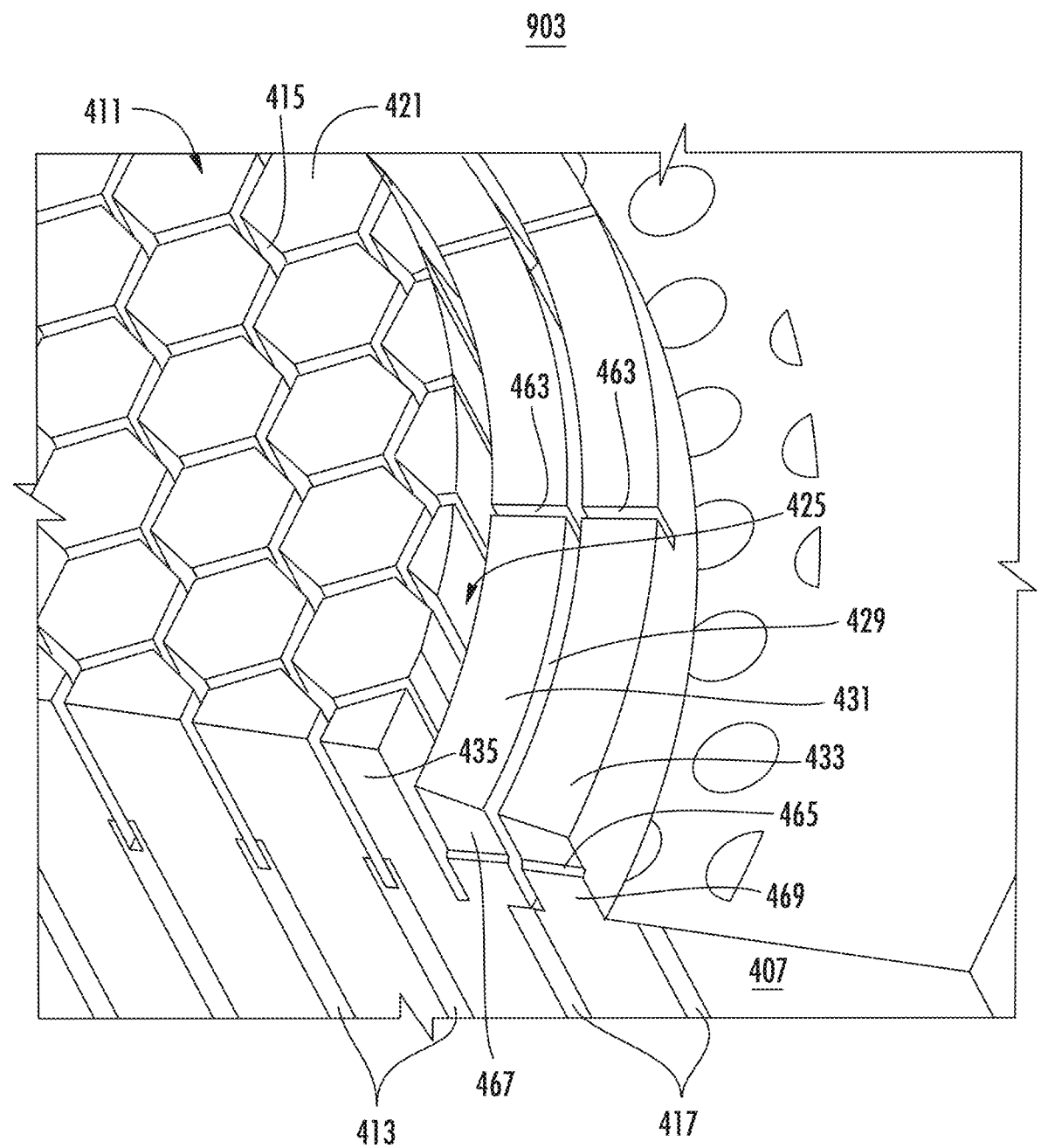
FIG. 10 is a cutaway isometric view of an extrusion die having a skin former region at the die periphery showing peripheral pins and slots according to some exemplary embodiments of the present disclosure.

FIG. 10 is a cutaway isometric view of an extrusion die 903 having a skin former region at the die periphery showing peripheral pins 467, 469 and slots 425, 429 according to some exemplary embodiments of the present disclosure. The extrusion die 903 is similar to the extrusion die 900, but extrusion die 903 has hexagonal matrix pins 421. Although not shown in FIG. 10, the outermost matrix pins 435 can also have a portion of the sides facing the first annular ring 425 angled away from the center of the die 903 similar to skin former surface 221 in FIG. 2 and exit surfaces 431, 433 to allow knitting of the laminar skin to the matrix.

Figure 11:
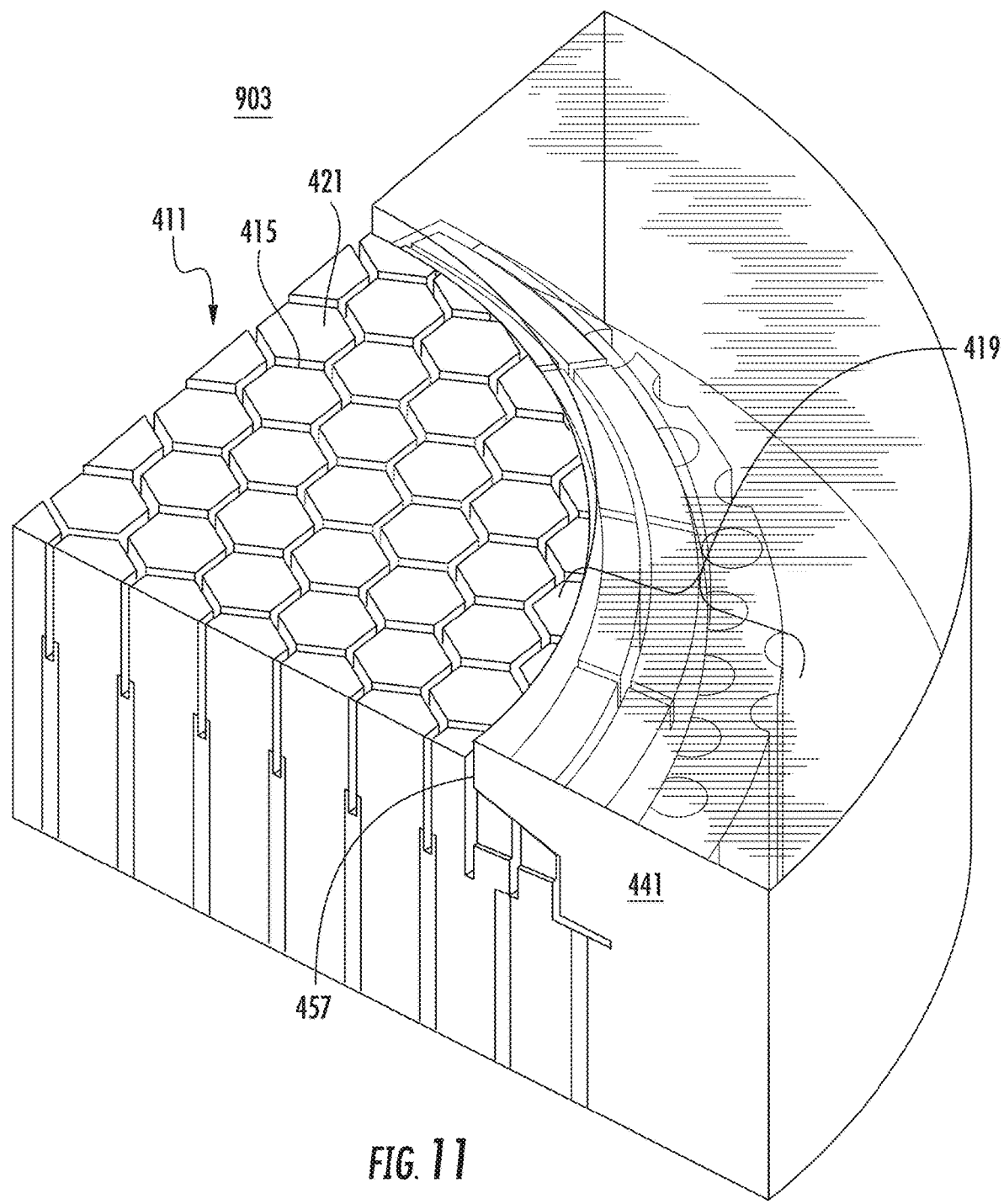
FIG. 11 is a cutaway isometric view of the extrusion die of FIG. 10 having a mask in the skin forming region at the die periphery according to some of these exemplary embodiments.

FIG. 11 is a cutaway isometric view of the extrusion die 903 of FIG. 10 having a mask 441 in the skin forming region at the die periphery according to some of these exemplary embodiments. The mask 441 is shown transparent merely for illustration of the underlying die 903 structure in the skin former region 419.

Figure 12:
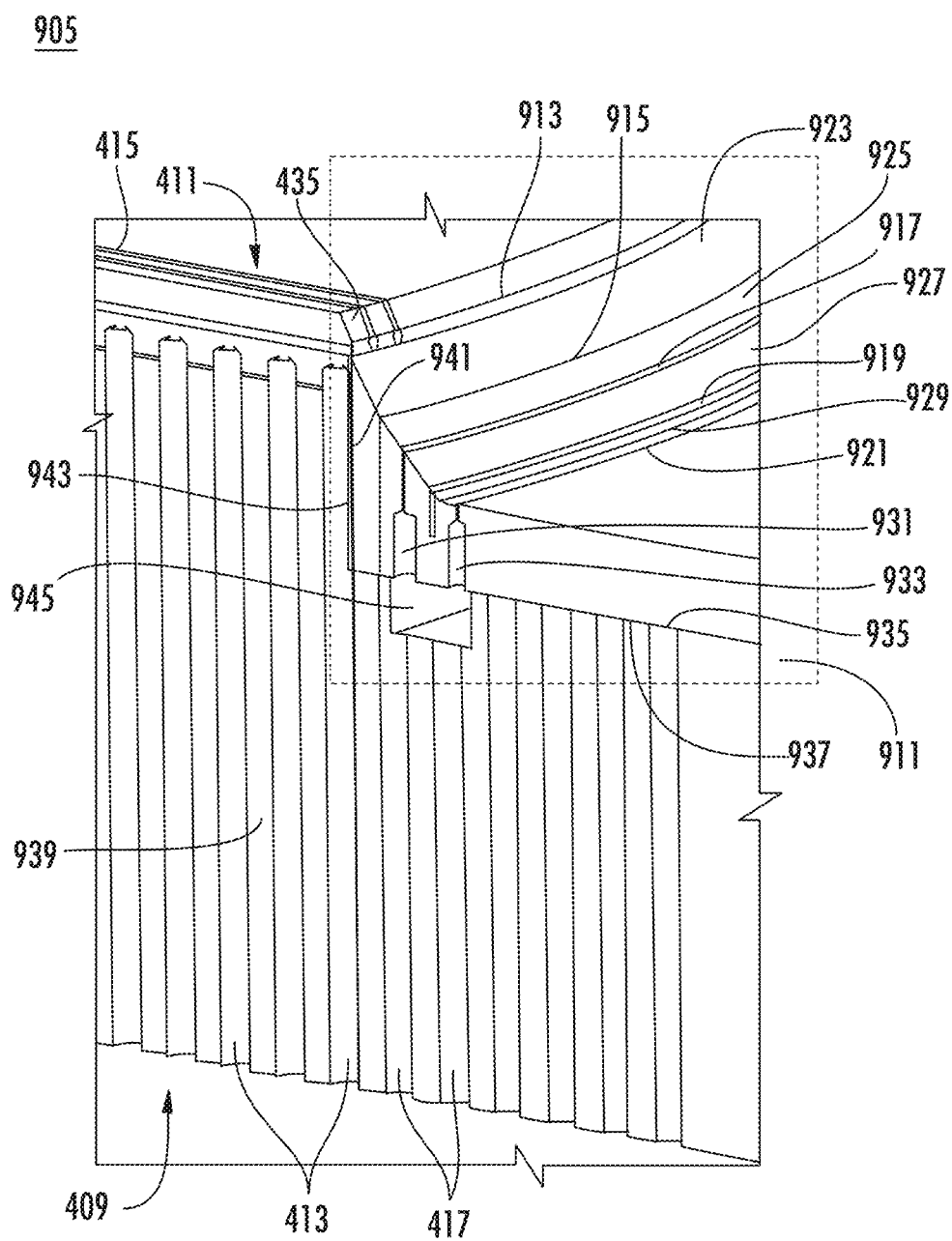
FIG. 12 is a cutaway isometric view of an extrusion die having a retrofit skin former at the die periphery showing peripheral slots according to some exemplary embodiments of the present disclosure.

FIG. 12 is a cutaway isometric view of an extrusion die 905 having a retrofit skin former 911 at the die periphery showing peripheral slots 913, 915, 917, 919, 921 according to some exemplary embodiments of the present disclosure. The retrofit skin former 911 has annular rings 923, 925, 927, 929 to define the annular slots 913, 915, 917, 919, 921 for forming the laminar skin similar to the embodiments described previously with reference to FIGS. 4 and 5. In addition, the retrofit skin former 911 has feed holes 931, 933 configured to provide batch material to the annular slots 913, 915, 917, 919, 921.

The retrofit skin former 911 can have a first surface 935 to contact a corresponding surface 937 on the die body 939. The retrofit skin former 911 can have a second surface 941 to contact a corresponding surface 943 on the die body 939. In this way the retrofit skin former 911 can fit snugly to the die body 939 with feed holes 417 in fluid communication with feed holes 931, 933. Clamping, bolting, and the like (not shown) can be used to secure the retrofit skin former 911 to the die body 939 to avoid leakage of batch material. The die body 939 can have a chamber 945 in surface 937 to receive batch material from die feed holes 417 and provide batch material to retrofit skin former feed holes 931, 933.

Figure 13B:
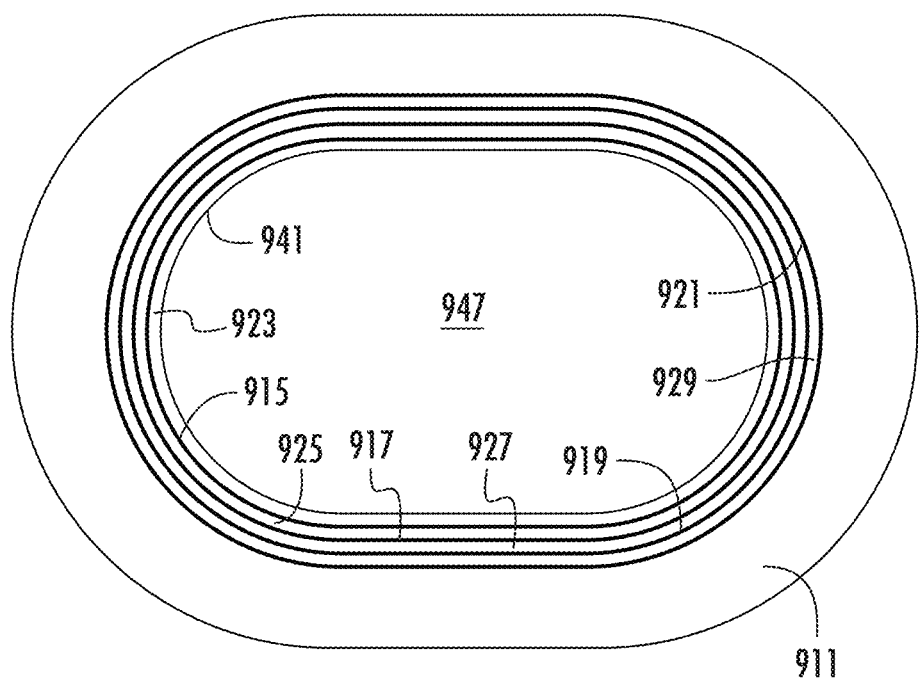
FIG. 13B is a top view at the exit face of the retrofit skin former of FIG. 12 according to some of these exemplary embodiments of the present disclosure.
Figure 13A:
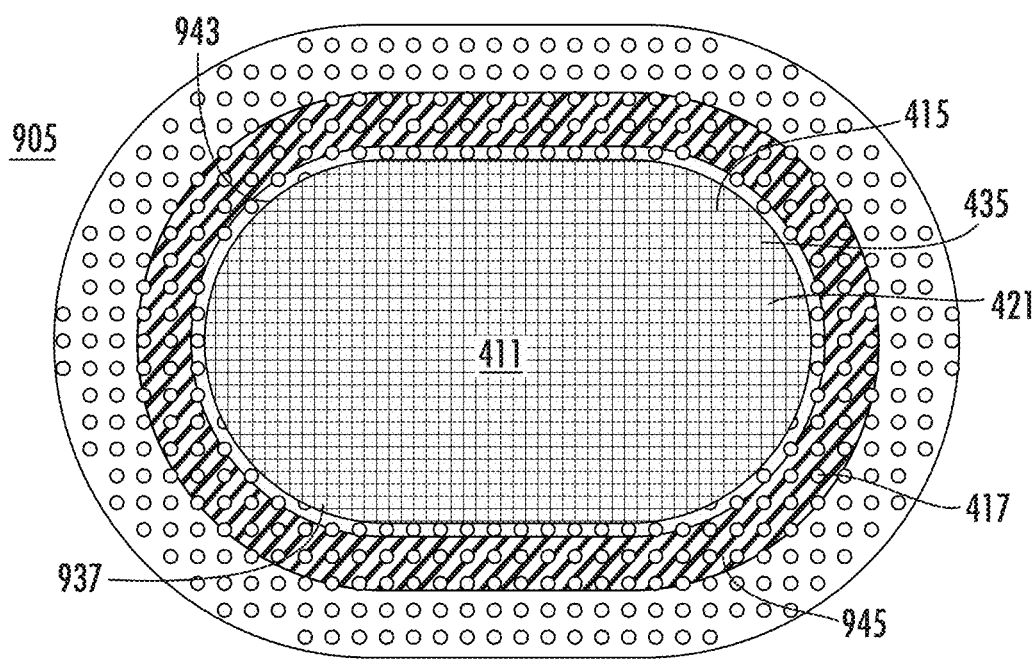
FIG. 13A is a top view at the exit face of the extrusion die of FIG. 12 without the retrofit skin former at the die periphery according to some of these exemplary embodiments of the present disclosure.
Figure 13C:
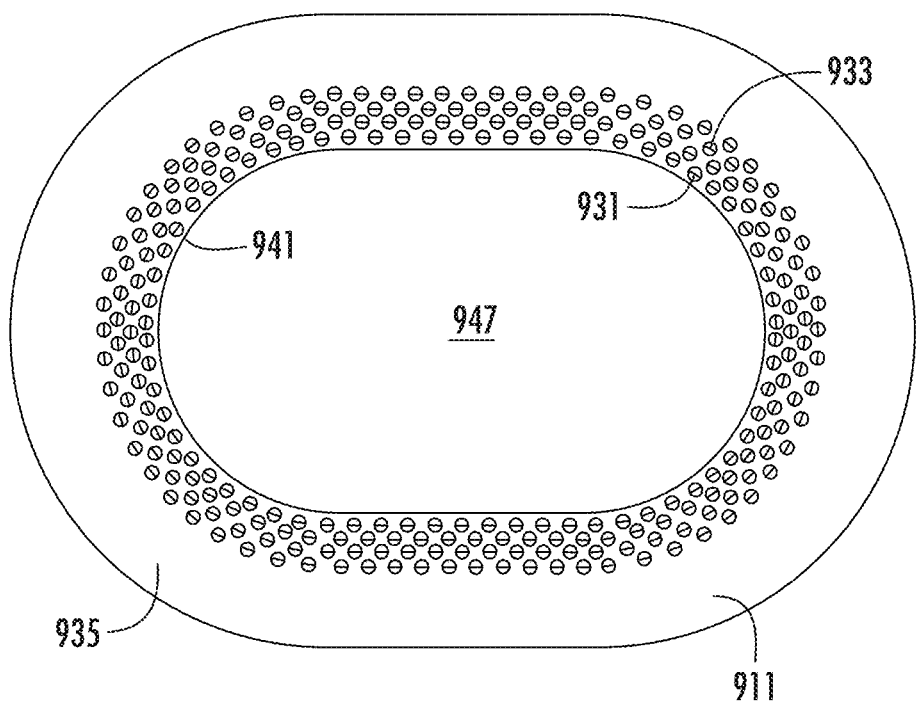
FIG. 13C is a bottom view at the input face of the retrofit skin former of FIG. 12 according to some of these exemplary embodiments of the present disclosure.

FIG. 13A is a top view at the exit face 411 of the extrusion die 905 of FIG. 12 without the retrofit skin former 911 at the die periphery according to some of these exemplary embodiments of the present disclosure. FIG. 13B is a top view at the exit face of the retrofit skin former 911 of FIG. 12 according to some of these exemplary embodiments of the present disclosure. Opening 947 defined by second surface 941 is configured to fit around the matrix of die 905. FIG. 13C is a bottom view at the input face of the retrofit skin former 911 of FIG. 12 according to some of these exemplary embodiments of the present disclosure.

EXAMPLES

Figure 14A:
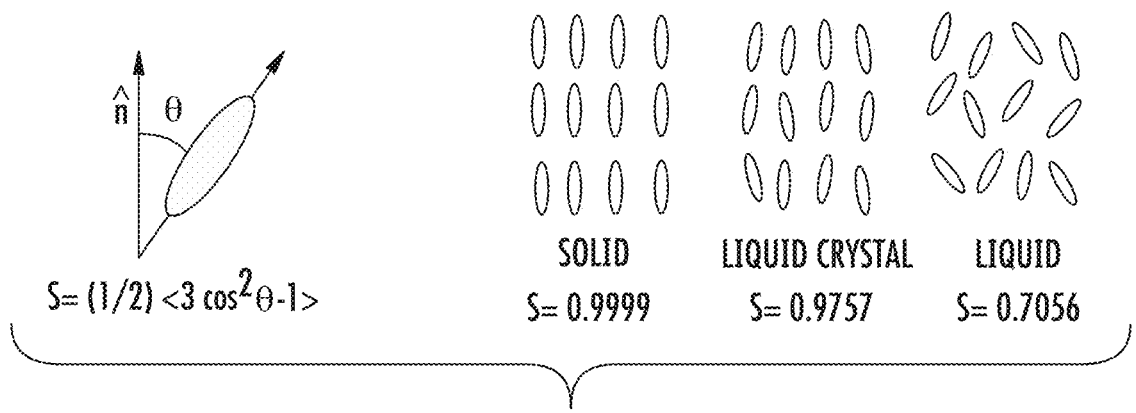
FIG. 14A is a schematic to describe an S-value as an order parameter used to quantify the particle alignment in green extruded ware according to some exemplary embodiments of the present disclosure.
Figure 14B:
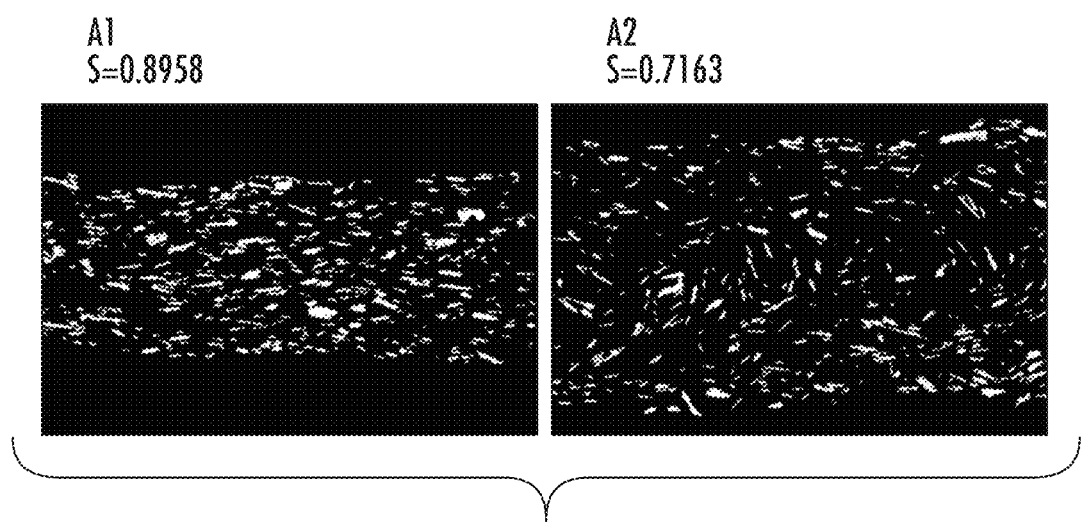
FIG. 14B is a micrograph of a sample "A" where S=0.8958 on the left having greater particle alignment than a sample "B" on the right where S=0.7163.

FIG. 14A is a schematic to describe an S-value as an order parameter used to quantify the particle alignment in green extruded ware according to some exemplary embodiments of the present disclosure. To quantify how much order is present in a material (green extruded substrate material), an order parameter (S) is referred to herein as follows:

$$S = (1/2) < 3\cos^2\theta - 1 > \quad \text{Equation (1)}$$

Where theta ($\theta$) is the angle between a determined direction and the long axis of each molecule. The brackets denote an average over all of the molecules in the sample. In an isotropic liquid, the average of the cosine terms is zero, and therefore the order parameter is equal to zero indicating completely random orientation of the molecules. For a perfect crystal (all molecules aligned in the same direction), the order parameter evaluates to one. FIG. 14B is a micrograph of a sample "A1" where S=0.8958 on the left having greater particle alignment than a sample "A2" on the right where S=0.7163.

Figure 15:
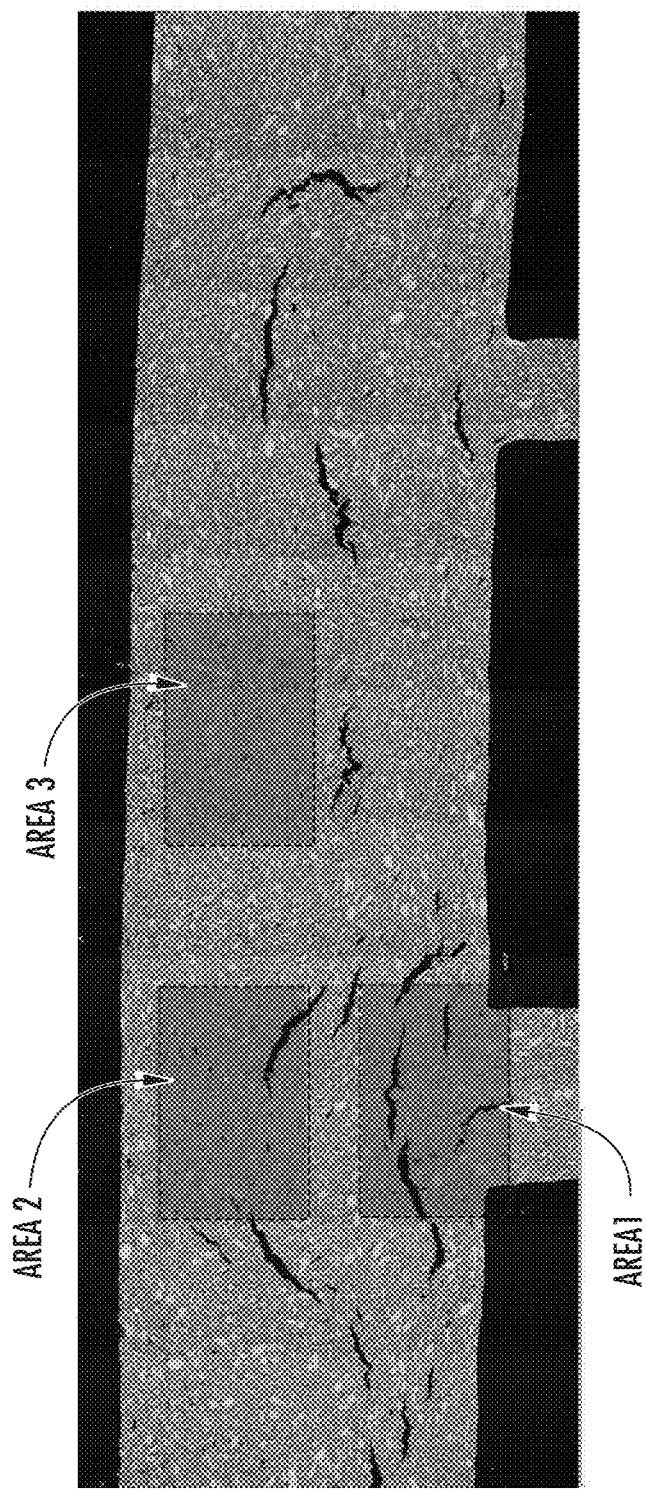
FIG. 15 is a backscatter scanning electron micrograph (SEM) image of a honeycomb body green ware cross section having non-laminar skin co-extruded on matrix showing three areas selected for S-value analysis. A die such as shown in FIG. 2 having matrix slots extending into the skin former region was used to make the honeycomb body green ware of FIG. 15.

FIG. 15 is a backscatter scanning electron micrograph (SEM) image of a honeycomb body green ware cross section having non-laminar skin co-extruded on matrix showing three areas selected for S-value analysis. A die such as shown in FIG. 2 having matrix slots extending into the skin former region was used to make the honeycomb body green ware of FIG. 15.

Figure 16:
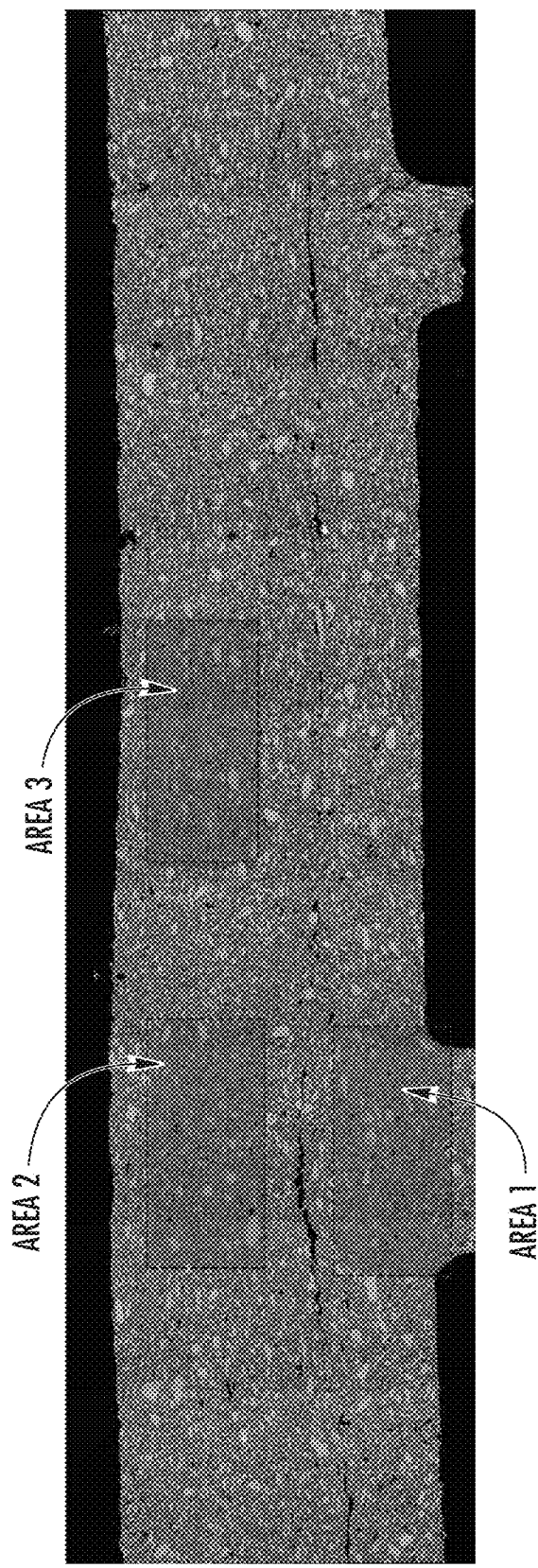
FIG. 16 is a backscatter SEM image of another honeycomb body green ware cross section having laminar skin co-extruded on matrix according to some exemplary embodiments of the present disclosure.

FIG. 16 is a backscatter SEM image of another honeycomb body green ware cross section having laminar skin co-extruded on matrix according to some exemplary embodiments of the present disclosure. In FIG. 16, three areas selected for S-value analysis are shown. A die such as shown in FIG. 9 having some radially extending slots in the skin former region was used to make the honeycomb body green ware of FIG. 16.

Figure 17:
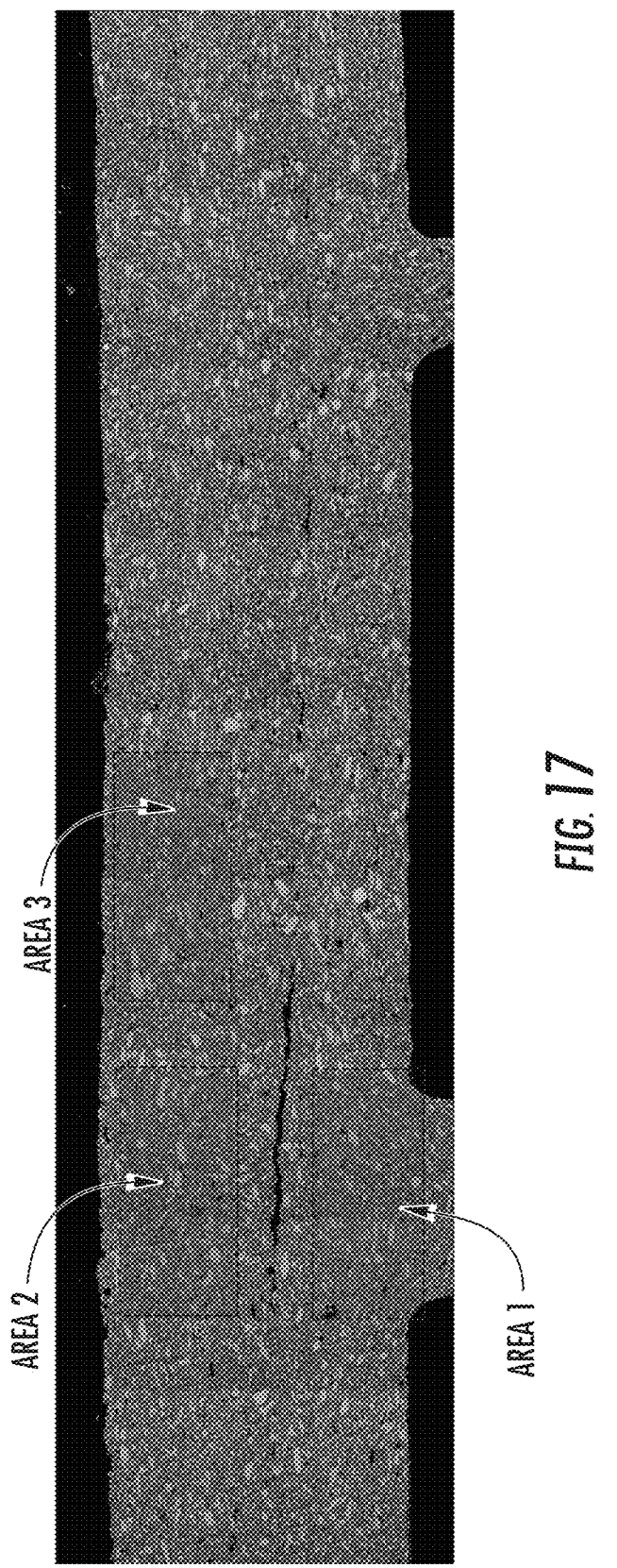
FIG. 17 is a backscatter SEM image of another honeycomb body green ware cross section having laminar skin co-extruded on matrix according to some exemplary embodiments of the present disclosure. Three areas selected for S-value analysis are shown in FIG. 17. A die such as shown in FIG. 4 having only annularly extending slots in the skin former region was used to make the honeycomb body green ware of FIG. 17.

FIG. 17 is a backscatter SEM image of another honeycomb body green ware cross section having laminar skin co-extruded on matrix according to some exemplary embodiments of the present disclosure. Three areas selected for S-value analysis are shown in FIG. 17. A die such as shown in FIG. 4 having only annularly extending slots in the skin former region was used to make the honeycomb body green ware of FIG. 17.

Polished cross-sections were prepared from parts dried at 200° C. for 4 hours to help further dry them and to remove some of the oils to help with the epoxy impregnation process. The samples were cut and polished to generate separate specimens from each sample. The specimens were polished across the cross-section of the open face of the part. The polished cross-sections of comparative sample (CS) shown in FIG. 15, and exemplary samples (ES) shown in FIG. 16 (ES1) and FIG. 17 (ES2) were prepared with conductive carbon coating evaporated onto the samples to reduce charging. The samples were then analyzed with a Zeiss® 1550VP at 20 kV and 300× magnification.

The polished specimens were imaged at 300× magnification using the large area mapping automated image acquisition software package in Oxford Instruments Aztec EDS microanalysis® software to acquire large fields of view for observation of particle alignment in the skin. The stitched image montage for each specimen is shown.

Media Cybernetics Image Pro Premier® image analysis software was used to quantify the S-value parameter. The montage images were segmented to create an image mask that isolated the larger talc, silica and alumina particles from the smaller clay particles. The masked images were then used to quantify the angle in degrees of the long axis of each particle larger than 25 µm² from the reference 0° horizontal image axis. The angle in degrees of each particle was converted to radians and the S-value parameter as defined in Equation (1) was calculated. The average S-value parameter was calculated using the Descriptive Statistics program in Microsoft Excel®.

The S-value results are shown in Table 1 for comparative sample (CS), Table 2 for exemplary sample one (ES1), and Table 3 for exemplary sample two (ES2) below. The lower the S-value, the more random the particle alignment.

TABLE 1

CS-Select Area S-Value

|  | Area 1 | Area 2 | Area 3 |
| --- | --- | --- | --- |
| Mean | 0.37 | 0.45 | 0.37 |
| Standard Error | 0.02 | 0.01 | 0.01 |
| Median | 0.48 | 0.62 | 0.47 |
| Mode | 1.00 | 0.25 | 0.25 |
| Standard Deviation | 0.52 | 0.49 | 0.52 |
| Sample Variance | 0.27 | 0.24 | 0.27 |
| Kurtosis | −1.35 | −0.99 | −1.34 |
| Skewness | −0.35 | −0.63 | −0.33 |
| Range | 1.50 | 1.50 | 1.50 |
| Minimum | −0.50 | −0.50 | −0.50 |
| Maximum | 1.00 | 1.00 | 1.00 |
| Sum | 1093.56 | 1417.13 | 826.85 |
| Count | 2963 | 3061 | 2255 |

TABLE 2

ES1-Select Area S-Value

|  | Area 1 | Area 2 | Area 3 |
| --- | --- | --- | --- |
| Mean | 0.39 | 0.46 | 0.51 |
| Standard Error | 0.01 | 0.01 | 0.01 |
| Median | 0.52 | 0.62 | 0.69 |
| Mode | 1.00 | 1.00 | 1.00 |
| Standard Deviation | 0.52 | 0.51 | 0.48 |
| Sample Variance | 0.27 | 0.26 | 0.23 |
| Kurtosis | −1.32 | −1.11 | −0.76 |
| Skewness | −0.40 | −0.59 | −0.78 |
| Range | 1.50 | 1.50 | 1.50 |
| Minimum | −0.50 | −0.50 | −0.50 |
| Maximum | 1.00 | 1.00 | 1.00 |
| Sum | 760.85 | 1049.93 | 1201.90 |
| Count | 1952 | 2293 | 2354 |

TABLE 3

ES2-Select Area S-Value

|  | Area 1 | Area 2 | Area 3 |
| --- | --- | --- | --- |
| Mean | 0.44 | 0.43 | 0.57 |
| Standard Error | 0.01 | 0.01 | 0.01 |
| Median | 0.56 | 0.61 | 0.77 |
| Mode | 1.00 | 1.00 | 1.00 |
| Standard Deviation | 0.49 | 0.53 | 0.47 |
| Sample Variance | 0.24 | 0.28 | 0.22 |

TABLE 3-continued

ES2-Select Area S-Value

| | Area 1 | Area 2 | Area 3 |
|---|---|---|---|
| kurtosis | −1.11 | −1.24 | −0.31 |
| Skewness | −0.53 | −0.53 | −1.00 |
| Range | 1.50 | 1.50 | 1.50 |
| Minimum | −0.50 | −0.50 | −0.50 |
| Maximum | 1.00 | 1.00 | 1.00 |
| Sum | 988.39 | 815.74 | 1197.17 |
| Count | 2263 | 1900 | 2110 |

It was found that there were some differences in the degree of particle alignment between samples. The laminar skin provides improved orientation in regions away from the skin to web interface. It was also found that there was greater alignment of the particles in the long axis, or extrusion direction, of the part and less of an alignment in the cross-section of the part. The large dark cracks in the micrographs were the result of low pressure experimental dies used in making the examples. However, the shape of these cracks in FIG. 15 for CS Areas 1 and 2 indicate a large web affected zone. In contrast, FIGS. 16 and 17 for ES1 and ES2, respectively, show less cracks, and the cracks are parallel to the skin surface indicating a much smaller web affected zone in accordance with the descriptions of exemplary embodiments of the disclosure set forth herein.

According to some of these exemplary embodiments, the order parameter S for greater than 50% of the skin wall thickness can be greater than or equal to 0.4, for example, greater than or equal to 0.45, or even greater than or equal to 0.5. Further, the order parameter S for greater than 60% of the skin wall thickness can be greater than or equal to 0.4, for example, greater than or equal to 0.45, or even greater than or equal to 0.5. Even further, the order parameter S for greater than 70% of the skin wall thickness can be greater than or equal to 0.4, for example, greater than or equal to 0.45, or even greater than or equal to 0.5.

According to exemplary embodiments of the disclosure a skin produced by the dies having annular rings to define annular slots to form the skin enables the reduction or elimination of stresses previously resulting from physical thermal expansion property mismatch between the matrix and skin during heating and cooling during use of the ceramic honeycomb bodies. Failures of ceramic honeycomb bodies in oven thermal shock testing generally occur in the skin, and so the integral laminar skin disposed on the matrix as disclosed herein having particles oriented as in the matrix can increase the failure temperature in oven thermal shock testing. The improved match in thermal expansion coefficient between skin and matrix can lead to improved thermal shock resistance of the honeycomb body. Furthermore, the methods disclosed herein to provide integral laminar skin disposed on the matrix having particles oriented as in the matrix can lead to improved skin thickness uniformity and improved honeycomb body isostatic strength.

It will be apparent to those skilled in the art that various modifications and variations can be made in the disclosed exemplary embodiments without departing from the spirit or scope of the disclosure. Thus, it is intended that the appended claims cover the modifications and variations of this disclosure provided they come within the scope of the appended claims and their equivalents.

What is claimed is:

1. A honeycomb extrusion die, comprising:
a die body comprising:
a die exit face comprising a plurality of central slots and a skin former region disposed peripheral to the central slots, the skin former region comprising a plurality of annular slots wherein the central slots terminate at a first annular slot of the plurality of annular slots, wherein the central slots define matrix pins that extend axially to an exit face and the annular slots define annular rings that extend axially to the exit face, and wherein exit surfaces of the annular rings are inclined away from the matrix pins.

2. The honeycomb extrusion die of claim 1, wherein the central slots comprise a thickness of greater than or equal to 0.001 inch (0.0254 mm) and less than or equal to 0.014 inch (0.356 mm).

3. The honeycomb extrusion die of claim 1, wherein each annular slot comprises a thickness of greater than or equal to 0.001 inch (0.0254 mm) and less than or equal to 0.014 (0.356 mm).

4. The honeycomb extrusion die of claim 1, wherein the plurality of central slots comprises at least two annular slots and less than five annular slots.

5. The honeycomb extrusion die of claim 1, wherein the die body further comprises:
central feed holes in communication with the central slots, and
peripheral feed holes in communication with the annular slots.

6. The honeycomb extrusion die of claim 1, wherein the matrix pins extend further than the annular rings axially.

7. The honeycomb extrusion die of claim 6, wherein the exit surfaces of the annular rings are inclined away from the matrix pins at an angle greater than 0 degrees from the die exit face and less than or equal to 60 degrees from the die exit face.

8. The honeycomb extrusion die of claim 1, wherein the central slots define radial pins.

9. The honeycomb extrusion die of claim 1, wherein the central slots define hexagonal pins.

10. The honeycomb extrusion die of claim 1, wherein the annular rings comprise radial slots, a frequency of the radial slots being less than a frequency of the central slots at the first annular slot.

11. The honeycomb extrusion die of claim 10, wherein a depth of the radial slots of the annular rings is less than a depth of the annular slots.

12. A method of manufacturing a ceramic honeycomb body comprising intersecting walls that form channels extending axially from a first end face to a second end face, the method comprising:
extruding batch material through central slots of an extrusion die to form a honeycomb matrix and through a plurality of annular slots to form a lamellar peripheral skin on the honeycomb matrix, wherein the central slots terminate at a first annular slot of the plurality of annular slots,
and wherein elongated particles in the batch material are axially aligned during the extruding through the central and annular slots.

13. The method of making a porous ceramic honeycomb body of claim 12, wherein the elongated particles comprise at least one of plates and fibers.

14. The method of making a porous ceramic honeycomb body of claim 12, further comprising drying a green honeycomb body from the extruded batch material; and firing the dried green honeycomb body.

15. The method of making a porous ceramic honeycomb body of claim 12, wherein the batch material comprises one or more inorganic components that form at least one of cordierite, aluminum-titanate, mullite, β-spodumene, silicon carbide, and zeolite upon firing.

* * * * *